United States Patent [19]

Watanabe et al.

[11] Patent Number: 4,905,080
[45] Date of Patent: Feb. 27, 1990

[54] APPARATUS FOR COLLECTING TELEVISION CHANNEL DATA AND MARKET RESEARCH DATA

[75] Inventors: Fumio Watanabe; Yoshikazu Itoh, both of Tokyo; Shunji Wake, Kawasaki, all of Japan

[73] Assignees: Video Research Ltd.; Ikegami Tsushinki Co., Ltd., both of Tokyo, Japan

[21] Appl. No.: 214,716

[22] PCT Filed: Jul. 31, 1987

[86] PCT No.: PCT/JP87/00578

§ 371 Date: Jun. 1, 1988

§ 102(e) Date: Jun. 1, 1988

[87] PCT Pub. No.: WO88/01117

PCT Pub. Date: Feb. 11, 1988

[30] Foreign Application Priority Data

Aug. 1, 1986 [JP] Japan .................................. 61-180135
Aug. 1, 1986 [JP] Japan .................................. 61-180136
May 26, 1987 [JP] Japan .................................. 62-130791
Jun. 5, 1987 [JP] Japan .................................. 62-140057

[51] Int. Cl.$^4$ .............................................. H04H 9/00
[52] U.S. Cl. ........................................ 358/84; 379/92; 455/2
[58] Field of Search ................. 358/84; 379/92, 107; 455/2

[56] References Cited

U.S. PATENT DOCUMENTS

| | | | |
|---|---|---|---|
| Re. 31,951 | 7/1985 | Johnson et al. | 364/900 |
| 4,345,113 | 8/1982 | Shelley | 379/92 |
| 4,536,791 | 8/1985 | Campbell et al. | 358/84 X |
| 4,546,382 | 10/1985 | McKenna et al. | 358/84 |
| 4,566,030 | 1/1986 | Nickerson et al. | 358/84 |
| 4,603,232 | 7/1986 | Kurland et al. | 379/92 |
| 4,630,108 | 12/1986 | Gomersall | 358/84 |
| 4,639,728 | 1/1987 | Swanson | 379/107 X |
| 4,644,393 | 2/1987 | Smith et al. | 358/84 |
| 4,646,145 | 2/1987 | Percy et al. | 358/84 |
| 4,658,290 | 4/1987 | McKenna et al. | 358/84 |
| 4,779,198 | 10/1988 | Lurie | 358/84 X |
| 4,785,420 | 11/1988 | Little | 379/52 X |

*Primary Examiner*—Keith E. George
*Attorney, Agent, or Firm*—Spencer & Frank

[57] ABSTRACT

A data collecting apparatus is used in a survey system in which research data such as television audience ratings and market research data is collected by a data collecting device provided in each of a plurality of panelists' homes, the collected research data is sent to a data center through telephone links, and, at the data center, the data is processed with the aid of a large scale computer to calculate desired research data. The data collecting apparatus includes a channel detector for detecting a television channel being viewed, a market research data entry device, a personal data entry device, and a data processing device for storing and processing the entered data. The detected channel data and the entered personal data are transferred to the data processing device via domestic power supply lines. The market research data is efficiently entered with the aid of a bar-code reader and a keyboard in a sequence-non-ordered manner. The personal data is entered with an entry device using infrared light. The personal data entry device may have picture-like illustration images of respective panelists so that they need not remember personal identification numbers.

33 Claims, 21 Drawing Sheets

FIG. 1
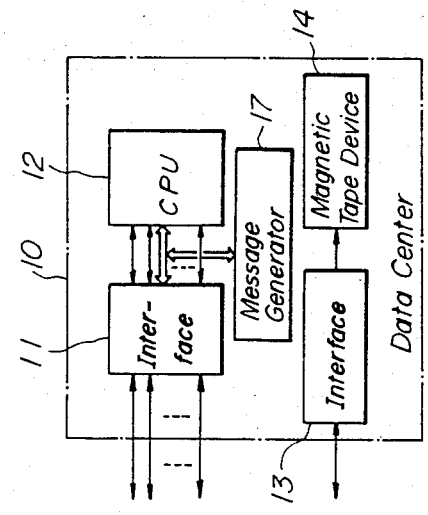
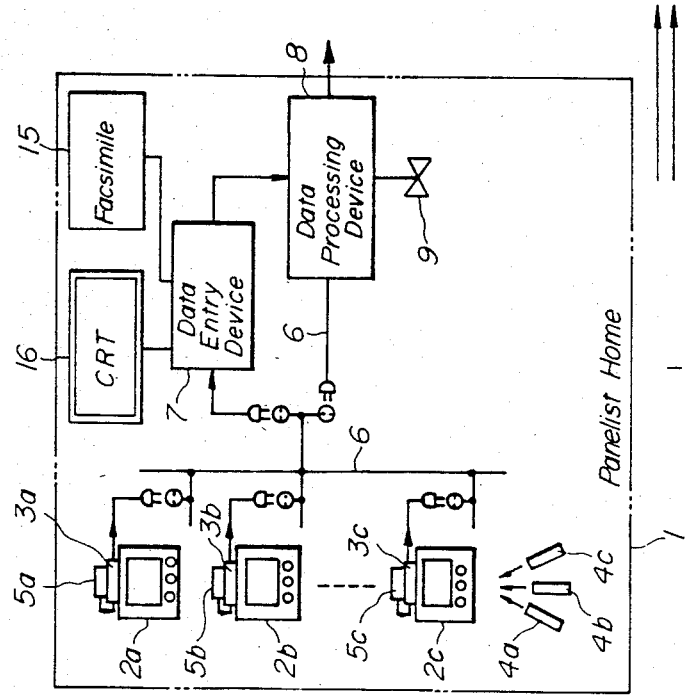

Including One Wave ($f_{C0} \sim f_{C3}$) and
One Wave ($f_{R0} \sim f_{R3}$)

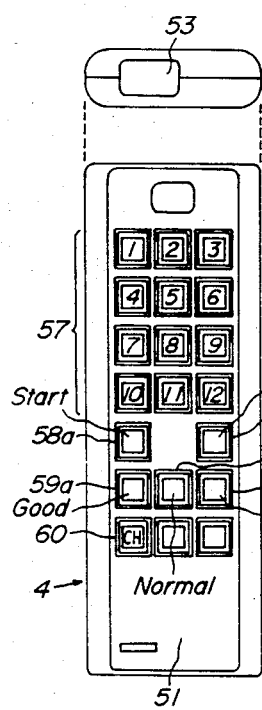
FIG_5A
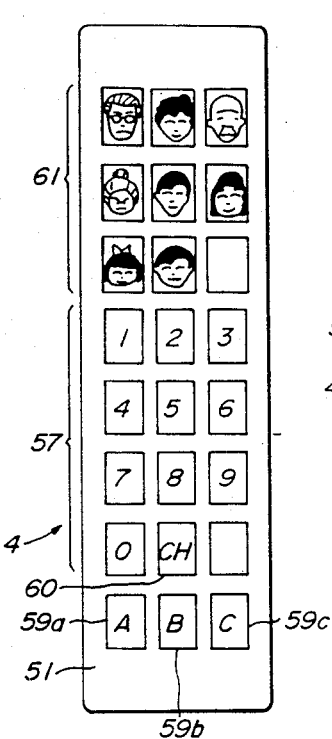
FIG_5B
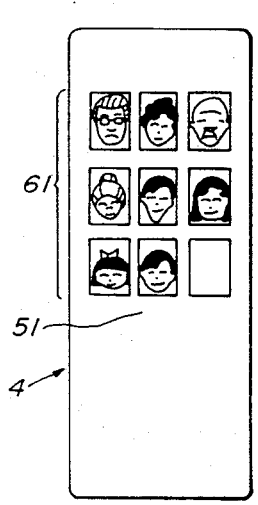
FIG_5C
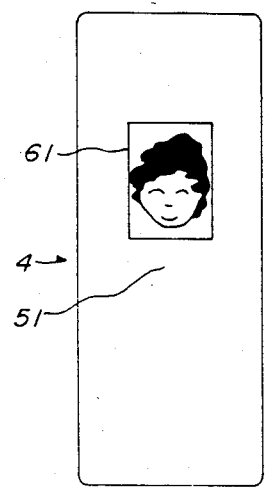
FIG_5D
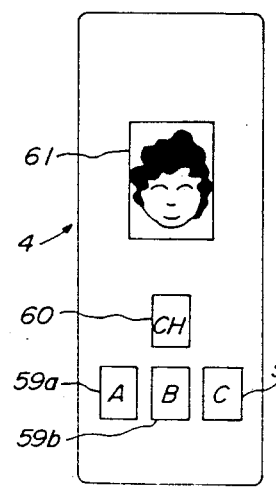
FIG_5E
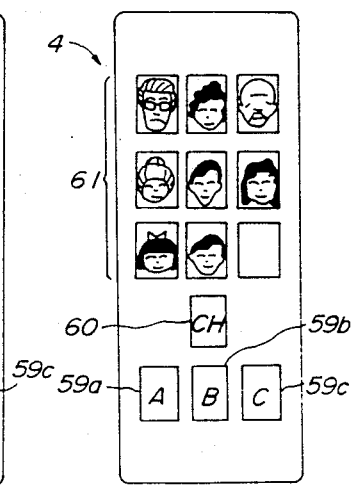
FIG_5F

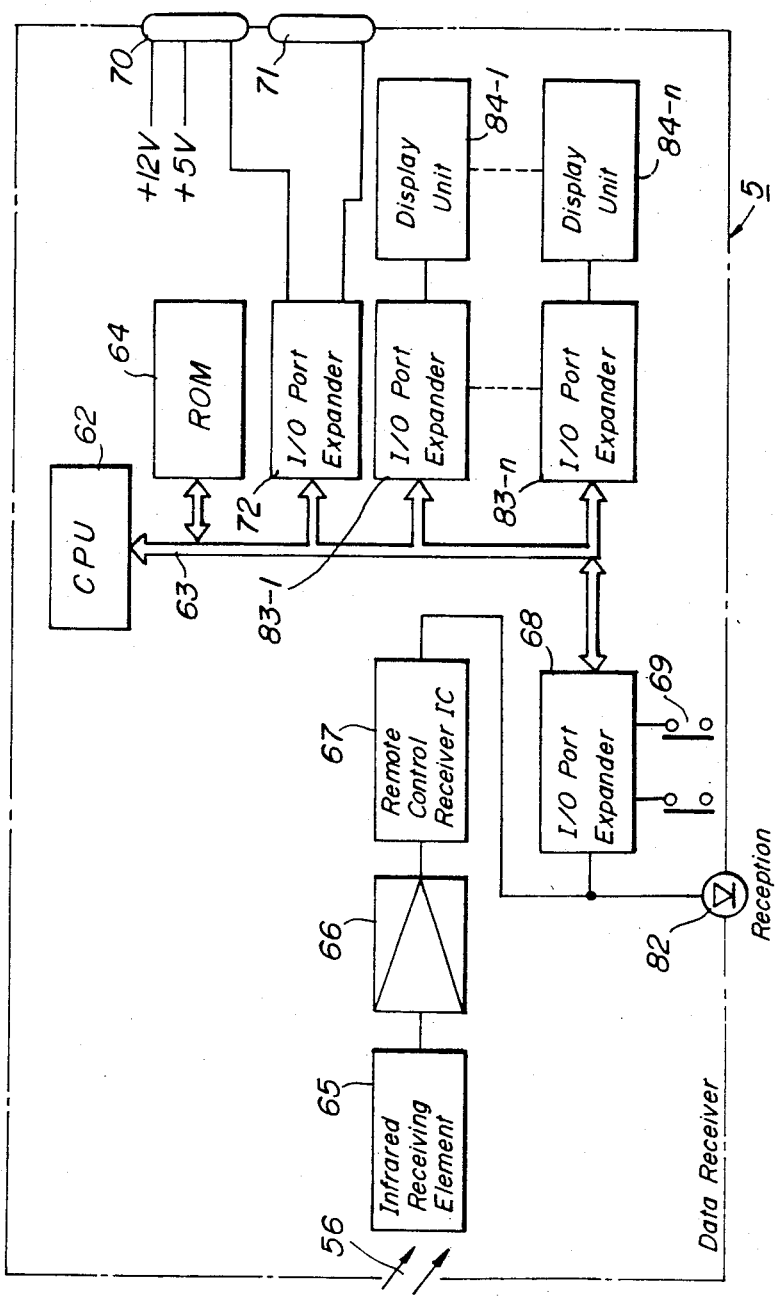

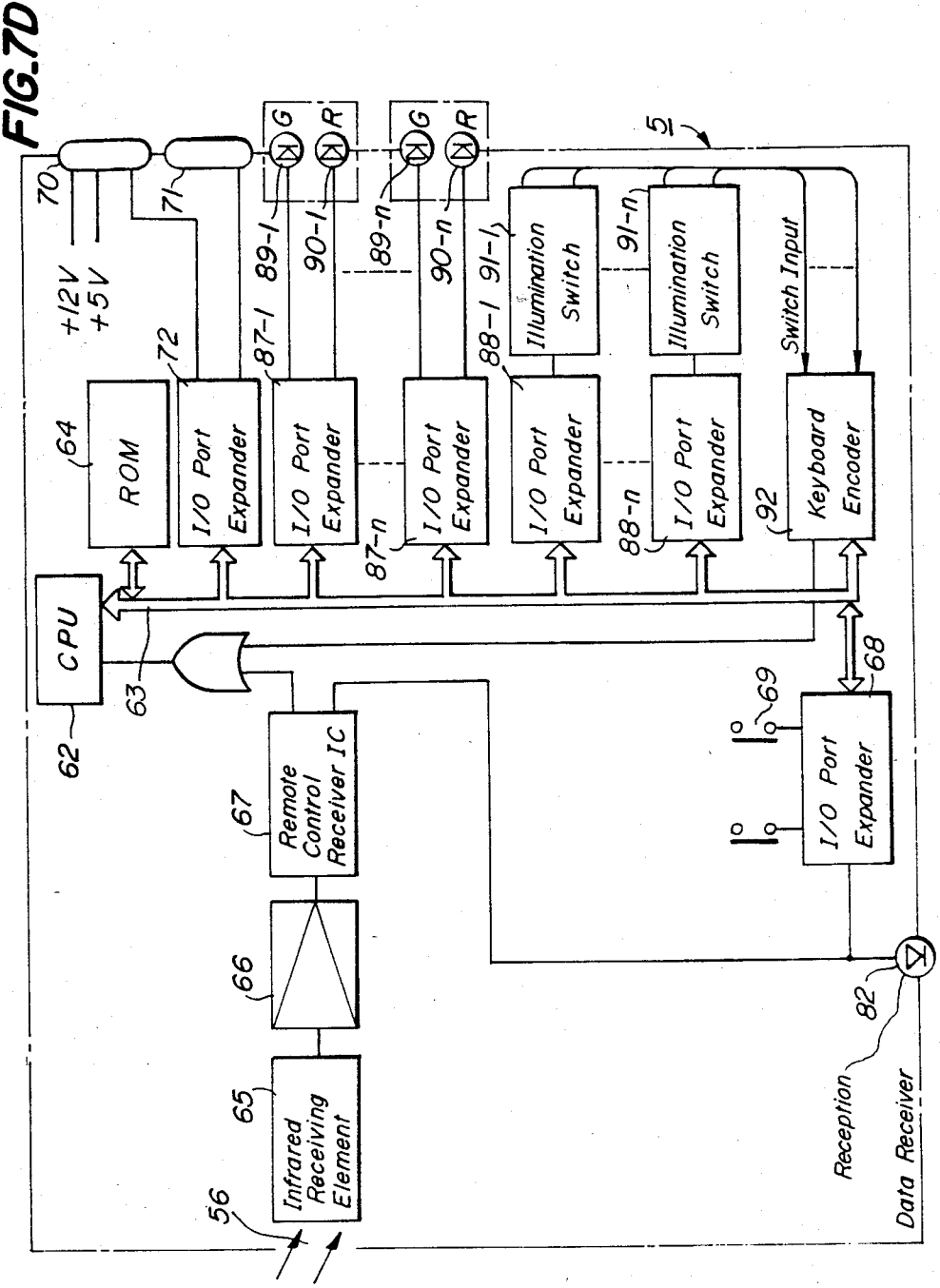

FIG_8
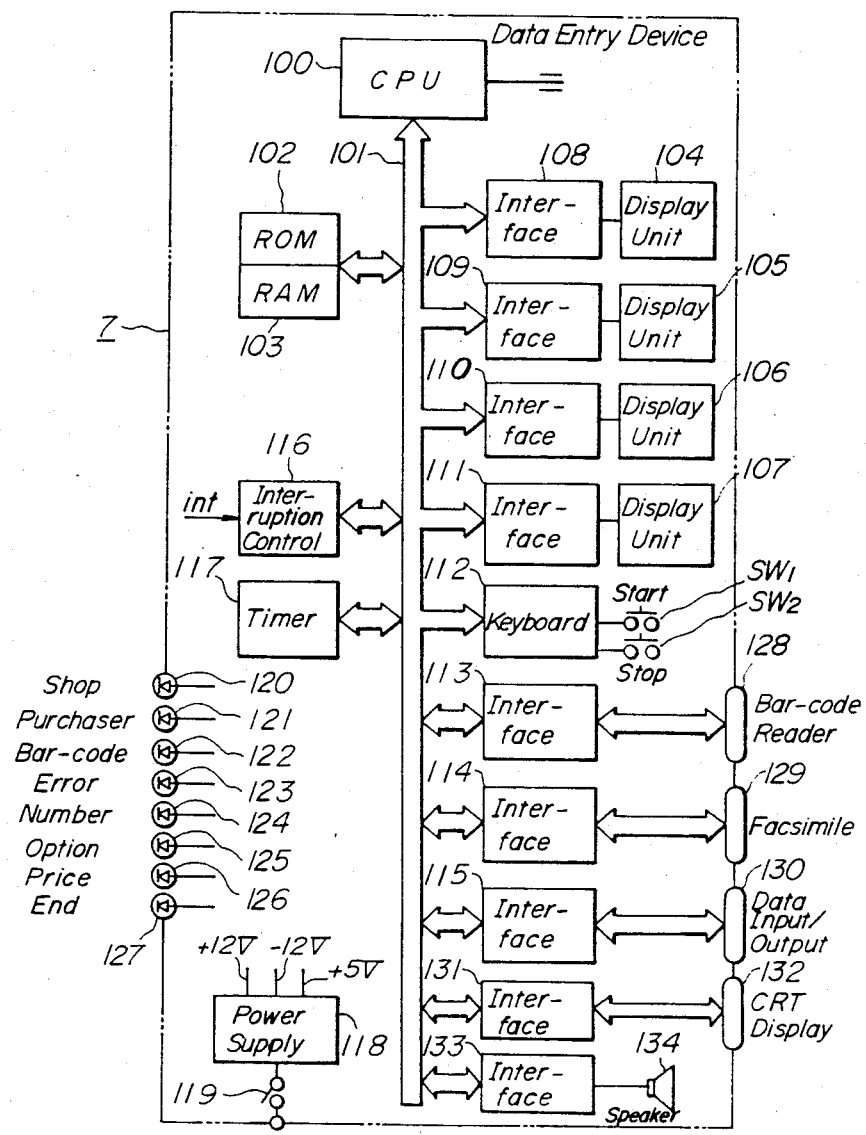

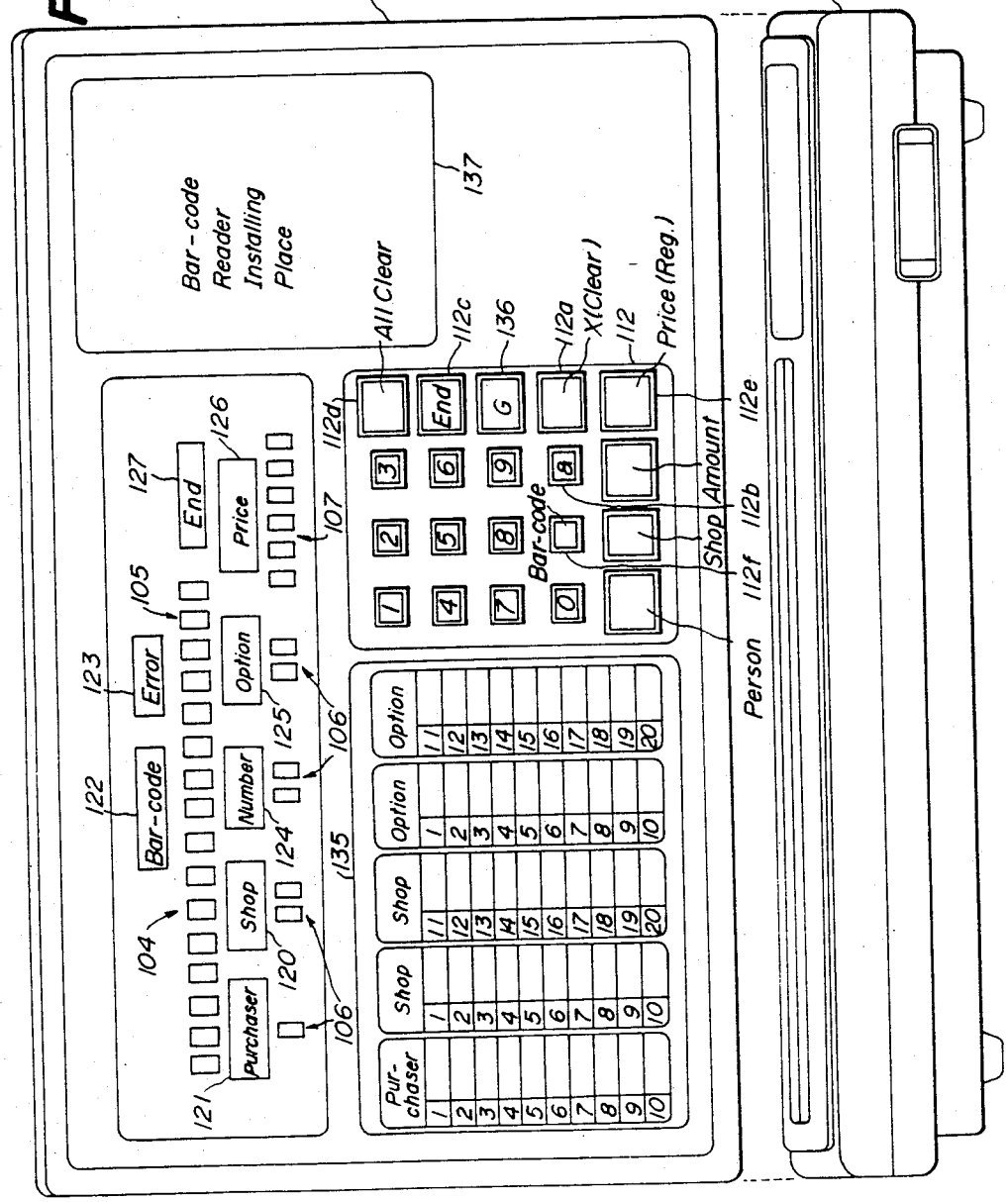

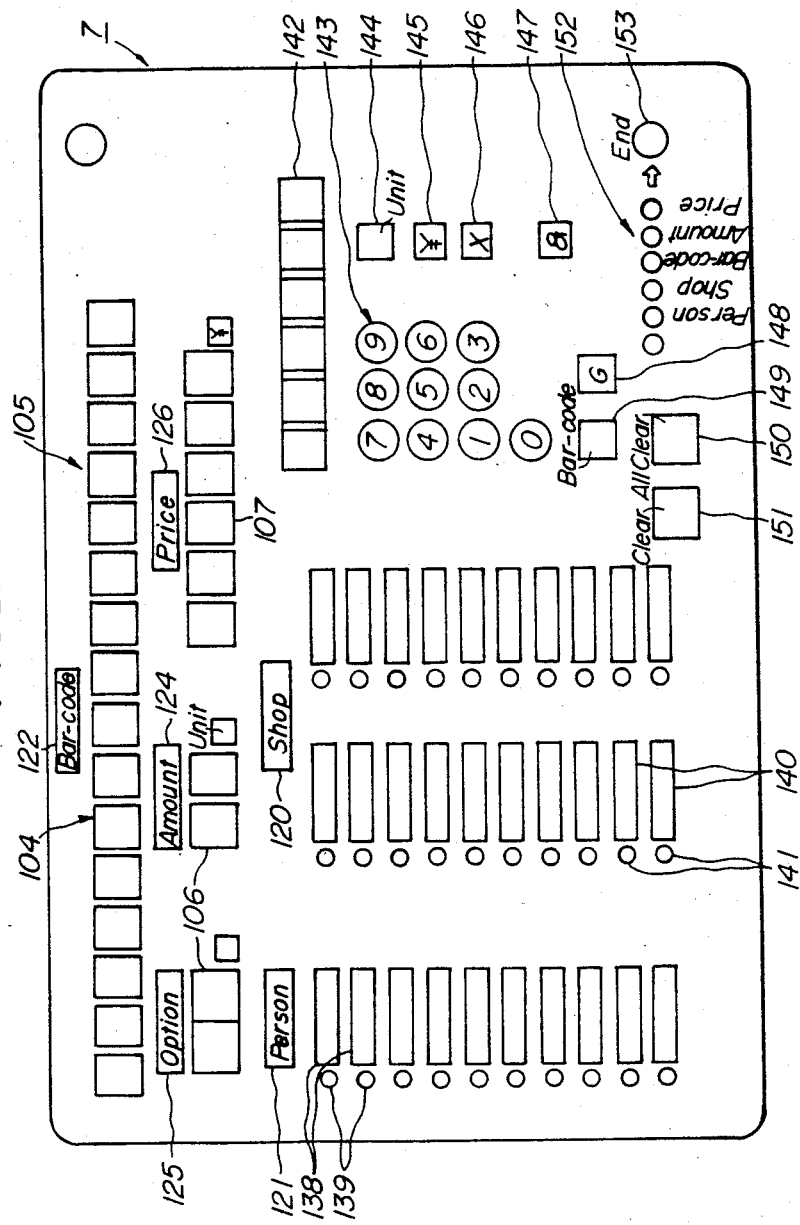

FIG_11
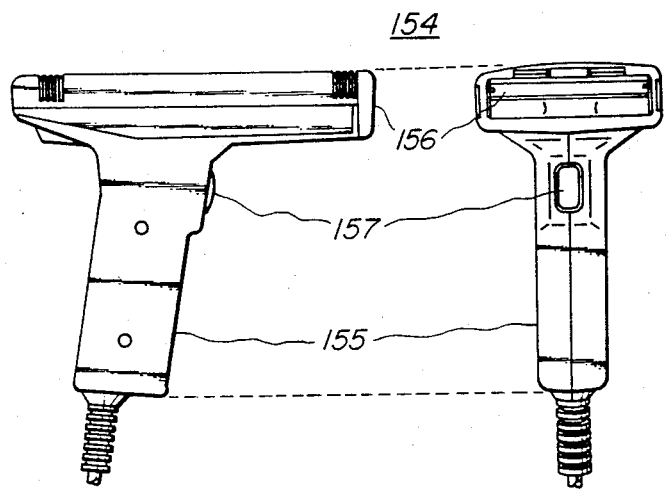

FIG_12
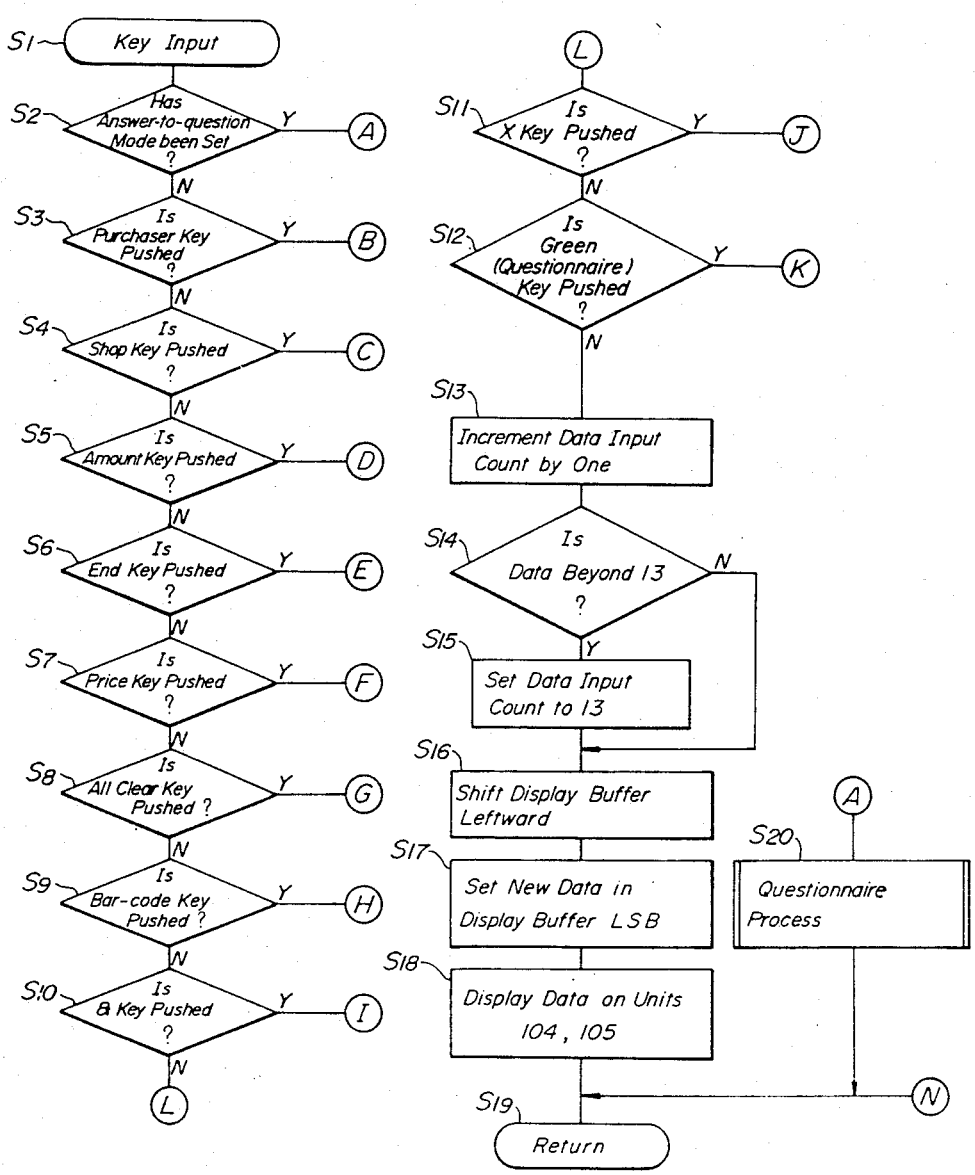

FIG_15

FIG.18

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 5 | 0 | 0 | 3 | 4 | 5 | 1 | 5 | 5 | 5 | 0 | 5 | 0 | 1 | 0 | 1 |

- 0: Code Number
- 1–4: Questionnaire Data (External Input)
- 5: Day of Week
- 6–7: Hour
- 8–9: Minute
- A–B: Second (Time)
- C–D: Channel No.
- E–F: TV Receiver No.

FIG.19

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 4 | F | F | 0 | 0 | 6 | 0 | 3 | 2 | 8 | 1 | 8 | 1 | 2 | 3 | 4 |

- 0: Code No.
- 1–4: Indication of Start Data
- 5–B: Time
- C–F: Panelist Home No.

APPARATUS FOR COLLECTING TELEVISION CHANNEL DATA AND MARKET RESEARCH DATA

BACKGROUND OF THE INVENTION

This invention relates to an apparatus for collecting and storing channel data of television receivers being viewed in a plurality of panelist's homes and market research data, and transmitting the collected data to a data center in given time periods for use in a system for collecting and processing the channel data and market research data at the data center.

Television audience ratings for television broadcasting have been measured by providing in each panelist's home a channel detector for detecting a television channel of a television receiver being viewed and a device for storing data supplied from the channel detector, and by collecting every day the stored channel data in response to a polling from a data center in which the channel data is analyzed by a computer to derive the television audience ratings. The applicants have proposed such an apparatus for measuring the television audience ratings in Japanese Patent Publication Kokai 54-80617. The applicants have also disclosed, in Japanese Patent Publication Kokai 54-80610, a data transmission system utilizing domestic power supply lines, and also proposed, in Japanese Patent Publication Kokai 54-10167, an apparatus in which terminals provided in panelist's homes for searching the television audience ratings are commonly used with subscriber's telephone sets.

Heretofore, market research data has been generally collected by a method which utilizes research booklets or questionnaires, and a method in which research data is picked-up electronically. The former method using the booklets has the merit that the object and range of a survey can be selected and changed at will, but also has demerits in that the delivery and collection of booklets require a lot of time and labor and in that error might be introduced in collecting data written on the booklets. In the market research data collection system in which data is picked-up with the aid of electric means, a market research data input device is provided in a panelist's home and data is entered therein by means of a bar-code reader and a keyboard, and then the data is sent to the data center via telephone type links and the data is analyzed by a computer. Heretofore, the measurement of television audience ratings and the market research were often effected separately from each other. In such a case, it is necessary to provide the system for measuring the television audience ratings and the system for performing the market research separately from each other, so that the cost might be high and an effective survey could not be performed.

In order to decrease data input error upon entering the market research data, there has been proposed a system in which simple messages are displayed on a display unit and the data is entered in a given order in an interactive manner.

There has recently been a demand to increase the scope and content of audience rating and market research. Research results such as audience ratings for respective home compositions, sexes and ages, evaluation for programs and reaction to commercials have been required. In order to satisfy such a requirement, a method of measuring audience ratings for respective persons with the aid of push buttons was experimentally effected. In this method, an operation device with a ten-key keypad was connected to the television channel detector via a cable and codes allocated to respective persons were entered with the keys at the start and end of periods of television watching, and personal evaluations were also entered. In this method, since the persons were identified by numbers the persons were liable to forget the identification code. Further, the use of the cable makes the method impracticable. Additionally, a device for transmitting the data from a data transmitter with a keyboard to a data receiver, with the aid of infrared light has been developed, in said device a total number of persons who are watching the television is entered using the device. But this system does not aim at the entering of data for identifying respective persons.

In the case of entering market research data in a predetermined order, i.e. in a sequence-ordered-system, it is necessary not to disturb the given order, while taking care of research items which have been entered, so that when the number of entering operations is large, the operator might become tired. In a data entering system in the interactive mode, although the mis-entering can be reduced, the entering time might be unnecessarily prolonged, particularly for persons who are skilled in this method, so that the efficiency of the data input operation is decreased. Moreover, since the same steps are repeated, the person might feel bored, and fail to enter the data correctly.

There have been further proposals for electrically effecting television audience ratings and acquiring market research data, in addition to those disclosed in the above mentioned three publications. U.S. Re. U.S. Pat. No. 31,951, "MARKET SURVEY DATA COLLECTION METHOD." discloses a market research data collecting apparatus in which data is entered in an interactive manner to reduce possible mis-operation and the data transmission to the data center is effected when a main memory has stored the data up to its capacity. An electronic audience rating and market research apparatus has been described in U.S. Pat. Nos. 4,566,030, "TELEVISION VIEWER DATA COLLECTION SYSTEM," and U.S. Pat. No. 4,546,382, "TELEVISION AND MARKET RESEARCH DATA COLLECTION SYSTEM AND METHOD." In both the methods, the market research is effected by substitution programs, a channel lock function is adopted for multiple use, and the data transmission to the data center is carried out at a predetermined time. Further, U.S. Pat. No. 4,630,108, "PROGRAMMED OVER-THE-AIR MARKETING RESEARCH SYSTEM," describes a market research apparatus utilizing cables and links with ordinary wireless communication, microwave transmission and satellite and substitution programs. Further, U.S. Pat. No. 4,644,393, "MEANS FOR MONITORING PEOPLE WHO ARE WATCHING A TELEVISION SET," discloses an apparatus for collecting television audience rating data, in which the total number of people watching the television is transmitted via infrared light or ultrasonic sound to a receiver with the aid of a key pad and is displayed on a monitor, and then is stored in a memory.

In the above mentioned apparatus for conducted television audience rating surveys and/or market research, the survey data does not include personal information of respective panelists, so that it is difficult to obtain useful data which meets the variety of needs of modern audience rating surveys and purchasers.

SUMMARY OF THE INVENTION

The present invention has for its object to provide an apparatus for collecting television channel data and market research data, said apparatus being easily installed in a panelist's home due to the fact that the survey for television audience ratings and the survey for the market research can be effected commonly, said apparatus being able to perform more effective surveys by including personal identification information of panelists, the market research data being entered promptly and easily in random order, and the apparatus being simple in construction and less expensive in cost.

It is another object of the invention to provide an apparatus for collecting personal data by extending the function of a keyboard of a market research data entry device.

It is still another object of the invention to provide a personal data entry device which includes a data transmitter having personal illustration images of respective panelists and employing an infrared beam, and a data receiver.

In order to attain the above mentioned objects, according to the invention, an apparatus for collecting television channel data and market research data, including a channel detector for detecting a channel of a television receiver being viewed by panelists to form channel data, a market research data entry device for entering the market research data including a plurality of items, and a data processing device for receiving the channel data and market research data supplied from the channel detector and market research data entry device, respectively to form data having given format, storing the data thus formed and for transmitting the data to a data center, is characterized in that the apparatus comprises means for entering personal identification information which is added to the channel data supplied from the channel detector, said market research data entry device is so constructed that the market research data can be entered in a sequence-non-ordered mode and personal identification information to be added to the market research data can be entered, and said data processing device includes means for transmitting the channel data and market research data having the personal identification information added thereto to the data center via a subscriber telephone link of a panelists' home in response to a polling from the data center within a predetermined time interval.

In the above mentioned data collecting apparatus according to the invention, the television channel data and market research data have the personal identification information added thereto, so that it is possible to know who watched what channel at what time as well as to know who bought what goods, and detailed surveys can be carried out. For example, television audience ratings for respective sexes and ages may be calculated.

BRIEF DESCRIPTION OF THE DRAWINGS

FIG. 1 is a block diagram showing an embodiment of the apparatus according to the invention for collecting both market research data and television audience rating data;

FIGS. 5A to 5F are plan views illustrating the outer appearance of several embodiments of the data transmitter;

FIGS. 7A to 7E are block diagrams showing the data receiver;

FIG. 8 is a block diagram representing the construction of an embodiment of a market research data entry device;

FIGS. 9 shows plan and front views, respectively, of the data entry device;

FIG. 10 is a plan view illustrating the outer appearance of another embodiment of the market research data entry device;

FIG. 11 shows side and front views, respectively, showing the outer appearance of a bar-code reader;

FIG. 12 is a flow chart for explaining the operation of entering the market research data in the sequence-non-ordered-manner;

FIG. 18 illustrates the format of a transmission data; and

FIG. 19 illustrates format of start data.

DESCRIPTION OF THE PREFERRED EMBODIMENTS

Figure 2:
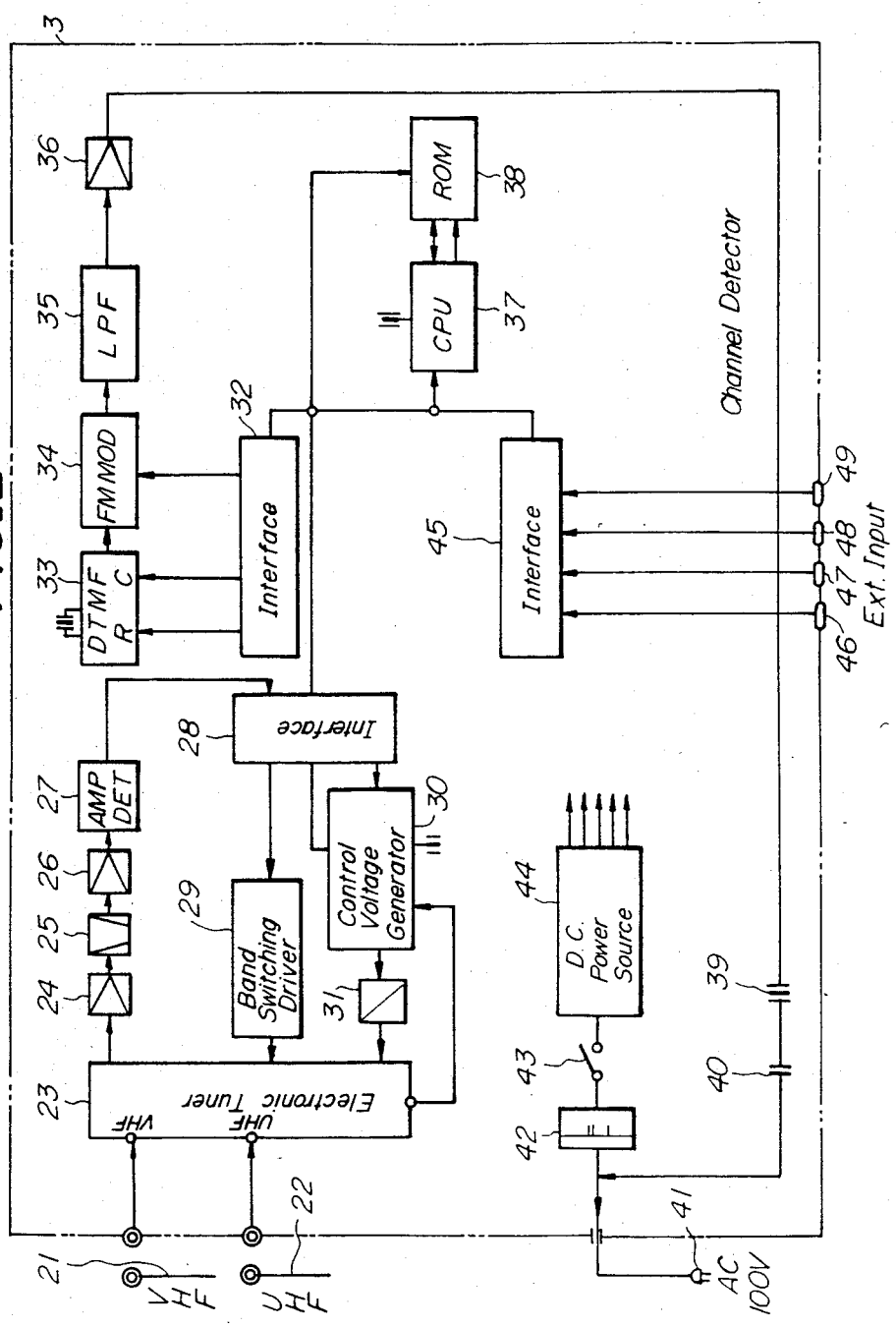
FIG. 2 is a block diagram illustrating a channel detector.

As stated above, the present applicants have filed patent applications, i.e. Japanese Patent Publication Kokai 54-80617, "TELEVISION AUDIENCE RATING SURVEY SYSTEM" for the measurement of television audience ratings, Patent Publication Kokai 54-80610, "METHOD OF TRANSMITTING DATA BY MEANS OF DOMESTIC POWER SUPPLY LINES" for transmission of data within a panelist's home from a channel detector to a data processing device, and Patent Publication Kokai 54-10607, "APPARATUS FOR COMMONLY USING SUBSCRIBER TELEPHONE LINK" for common use of a single subscriber link between a telephone set and a terminal device. These techniques provide the basic ideas for the present invention, but are described in detail in these publications, so that here only the summary thereof will be explained.

Now the present invention will be explained with reference to the embodiments illustrated in the drawings.

FIG. 1 is a block diagram showing an embodiment of the apparatus according to the invention for collecting television channel data and market research data together with personal identification information. In this apparatus, a channel detector and a data entry device are installed in a panelist's home, and data is transmitted to a data processing device and is processed and stored therein. The stored data is transmitted to a data center in response to a polling from the data center and given data is calculated at the data center.

Reference numeral 1 denotes a panelist's home and reference numeral 10 represents a data center. In the panelist home, there are arranged channel detectors 3a, 3b... besides television receiver sets 2a, 2b..., respectively to detect television channels being viewed. The detected channel data is transmitted to a data processing device 8 via domestic power supply lines 6. There is further provided a market research data entry device 7 which includes a bar-code reader and a keyboard for entering various kinds of data concerning products purchased by panelists. The entered data is transmitted to the data processing device 8. A personal data entry device is composed of a data transmitter 4 and a data receiver 5. The data transmitter 4a, 4b... transmit the data by means of infrared radiation. By pressing keys provided on the transmitters while watching television receiver screens, desired data can be transmitted to the data receivers 5a, 5b.... It should be noted that the data may be transmitted with the aid of ultrasonic waves or weak electromagnetic waves. Since the data transmitters 4a, 4b.. are handled while watching the television, the data receivers 5a, 5b... are preferably placed on the channel detectors 3a, 3b..., respectively. The data received by the data receivers 5a, 5b... is supplied to the channel detectors 3a, 3b..., and then is transmitted to the data processing device 8 together with the channel data via domestic power supply lines 6 in the FM mode. The data processing device 8 can identify various kinds of data supplied from the channel detectors 3a, 3b..., market research data entry device 7 and data transmitters 4a, 4b..., and converts these kinds of data into transmission data having a given format which is then stored. These equipments utilize a subscriber telephone type link commonly with a telephone set 9 in the panelist's home. The data center 10 comprises computer 12 and its interface 11. The computer 12 controls the data processing devices 8 provided in respective panelist's home terminals 1 and causes them to send the transmission data stored therein to the data center in a given order, and then calculates television audience ratings for respective channels and various kinds of marketing research information. The data center 10 further comprises a magnetic tape device 14 and its interface 13 which serve as a back-up for the computer 12. A plurality of telephone lines are connected to the data center 10 so that it can handle a plurality of the terminals 1 simultaneously. In the present embodiment, there are provided facsimile device 15 and CRT display device 16 connected to the market research data entry device 7, and the data center 10 comprises a message generator 17 for transmitting messages from the data center to panelist's homes.

FIG. 2 is a block diagram showing the construction of a channel detector 3 shown in FIG. 1. The channel detector detects a television channel by picking up an electromagnetic wave which leaks out of a local oscillator in the television receiver set. The channel detector comprises VHF pickup antenna 21, UHF pickup antenna 22 and electronic tuner 23 to which the electromagnetic wave from the local oscillator provided in the television receiver set is supplied. The electronic tuner 23 is scanned by a band switching driver 29 which is controlled by CPU 37 via an interface 28, and high and low bands of VHF and respective bands of UHF are switched. Then, the channel being viewed is searched with the aid of a control voltage generator 30 via a low pass filter 31. When the search frequency of the electronic tuner 23 is identical with the picked up frequency, the received signal is detected by intermediate frequency amplifier 24, band pass filter 25, intermediate frequency amplifier 26 and amplitude detector 27. The channel data is entered into the CPU 37 via the interface 28. The channel data thus detected is processed by CPU 37 and is sent to a transmission data forming device 33 via an interface 32 and is converted into transmission data having a given format. The transmission data is further supplied to a frequency modulator 34 to effect the frequency modulation. To the channel data there is added personal identification information which is supplied from the data receiver 5 and is received via terminals 46–49 and an interface 45. A ROM 38 is connected to CPU 37. ROM 38 stores all programs and frequency data allocated to the relevant channel detector. An output signal from the frequency modulator 34 is supplied via LPF 35, amplifier 36, transformer 39 and capacitor 40 to the commercial power supply. Therefore, by inserting a plug 41 into a socket, the data is transferred to the data processing device 8 via the domestic power supply lines.

Figure 3:
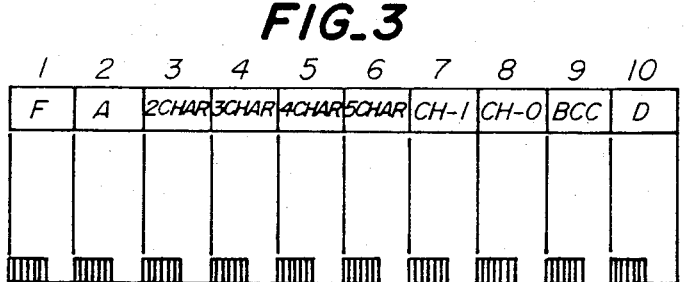
FIG. 3 is a schematic view depicting the channel data format.

FIG. 3 illustrates an example of the format of the transmission data. The transmission data consists of ten characters. Four characters F, A, BCC and D are reserved for an auxiliary transmission and the other six characters 2 CHAR~5 CHAR, CH-1 and CH-0 are used to transmit the detected channel data. Each character consists of four bits, so that it is possible to transmit sixteen data signals by respective characters. The transmission data may include, in addition to the channel data detected by the channel detector, other data which is entered from the external inputs 46~49 via the interface 45. The externally entered data may be the personal identification information from a data transmitter 4 via a data receiver 5.

Figure 4:
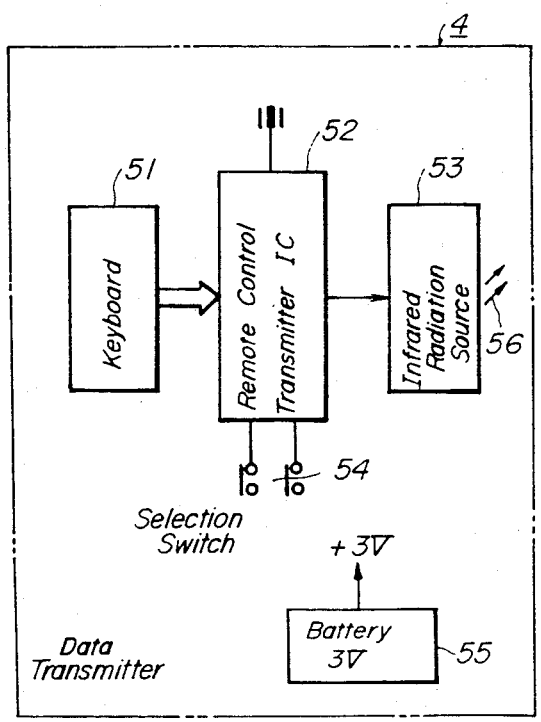
FIG. 4 is a block diagram showing a data transmitter of FIG. 1.

FIG. 4 is a block diagram showing the data transmitter 4. The data transmitter 4 has a construction similar to that of a remote control device using an infrared radiation source for use in domestic electronic apparatuses and has a battery 55 of 3 V. Data entered by a keyboard 51 is sent to a remote control transmitter IC 52 which actuates an infrared radiation source 53. Source 53 emits infrared radiation 56. The keyboard 51 is provided on a top surface of a housing for easy operation. Selection switches 54 correspond to selection switches of the data receiver as will be explained later, and are used to set groups of the personal data entry device.

FIGS. 5A~5F are plan views showing the construction of several embodiments of the keyboard of the data transmitter 4, the keyboards being constructed suitably for various applications. Keys may be of a push button type or touch type. FIG. 5A illustrates a construction in which the personal identification is effected by a numerical keypad portion 57. During a survey of television audience ratings, a "CH" key 60 is pushed, and "START" key 58a and "END" key 58b are pushed at the start and end of the survey of the television audience ratings. Evaluation data is entered by pushing either the "GOOD" key 59a, the "NORMAL" key 59b or the "BAD" key 59c.

In the embodiment shown in FIG. 5B, personal identification keys 61 have character or illustration images of father, mother, grandfather, grandmother, eldest boy, eldest girl, second eldest boy, second eldest girl, and so on. The keypad portion 57 is used to denote research items upon entering the market research data. When the research items are predetermined, the survey may be carried out without displaying questions on the television screen, and thus booklets are previously delivered and panelists may enter data at a convenient time. When a survey of television audience ratings is selected, the "CH" key 60 is used. Reference numerals 59a, 59b and 59c denote evaluation keys having three stages or grades A, B and C. For the evaluation data, there are usually three grades such as good, normal, bad; expensive, normal, cheap; large, middle, small; agree, no comment, disagree; and yes, no comment, no. These grades may be expressed commonly as A, B and C. When only a survey of television audience ratings is to be effected, item selection and evaluation are not necessary, so that it is sufficient to provide only a plurality of personal identification keys 61 as illustrated in Fig. 5C. Further, if transmitters are allocated to respective persons, it is not necessary to provide personal identification keys, and it is sufficient to use only a personal identification image as shown in FIG. 5D. FIGS. 5E and 5F show other embodiments in which research item denoting keys are deleted except for the television audience rating keys of the embodiment illustrated in FIG. 5B. This data transmitter is suitable for effecting surveys of television audience ratings and evaluations of television programs and for carrying out market research in a real time mode. The market research may be conducted by the answer-to-question method in response to questions displayed on the screen. In the answer-to-question method in a real time mode, answers can be obtained immediately, so it is not necessary to enter the research item and the data transmitter may be constructed as shown in FIGS. 5E or 5F.

FIGS. 6A to 6E show the outer appearance of several embodiments of the panel of the data receiver 5 and FIGS. 7A to 7E are block diagrams illustrating the internal construction thereof.

Figure 6A:
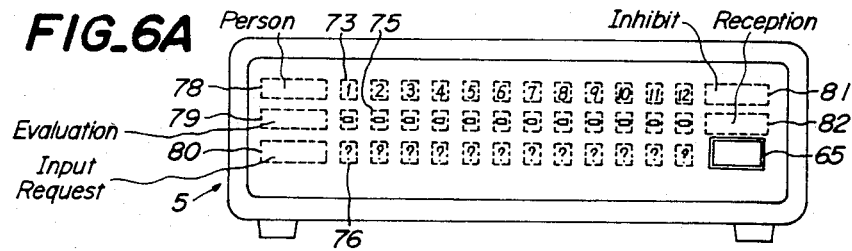
FIGS. 6A to 6E are plan views showing the outer appearance of several embodiments of a data receiver.
Figure 7A:
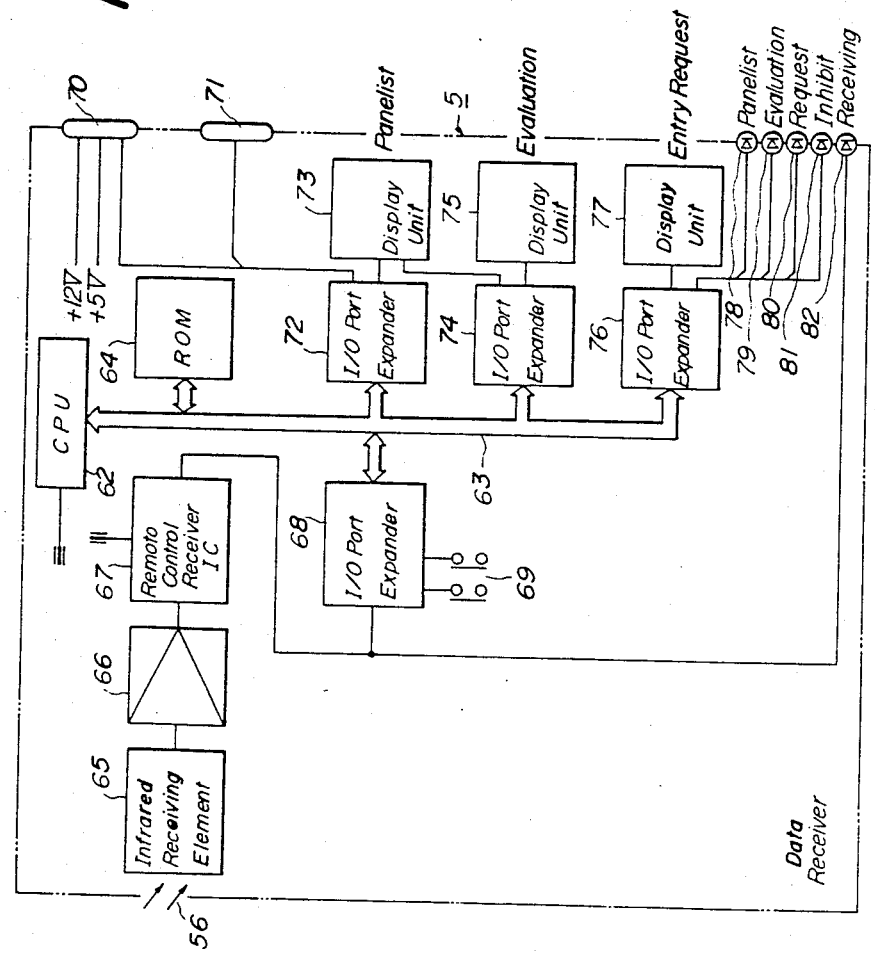

FIGS. 6A and 7A show a first embodiment in which persons, evaluations and input commands are indicated by display units 73, 75 and 76. when a push button of the keypad portion 57 in the keyboard 51 allocated to a person is pushed while the data transmitter 4 is directed to the data receiver 5, the infrared radiation 56 emitted from the radiation source 53 falls upon an infrared radiation receiving element 65 and is converted into an electrical signal. Then, the signal is amplified by an amplifier 66 and is detected by a remote control receiver IC 67. Then the detected data is used to light a light emitting diode 82 and is entered into a central processing unit (CPU) 62 via I/O port expander 68 and bus 63. Selection switches 69 which correspond to the selection switches 54 of the data transmitter 4 are provided, and are used to set the utility group of the personal data entry device 4. Reference numerals 78~82 denote LEDs. LEDs 78, 79 and 80 display a panelist's name, evaluation and entry request, respectively. LED 81 displays entry inhibit and LED 82 indicates the reception of the infrared radiation from the data transmitter 4. The data receiver 5 further includes a ROM 64 for storing necessary programs. The CPU 62 has a timer installed therein and controls all the other devices. The data signal is transmitted from output terminals 70, 71 to the channel detector 3 via a cable. Terminal 70 is also used for receiving the power supply. Display units 73, 75 and 77 are connected to data bus 63 via I/O port expanders 72, 74 and 76, respectively. The display unit 73 denotes panelists who are engaged with the survey.

Figure 6B:
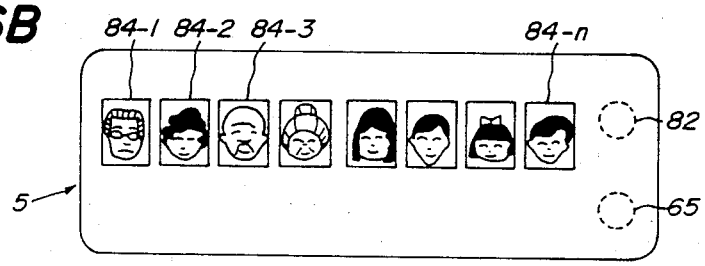
Figure 6C:
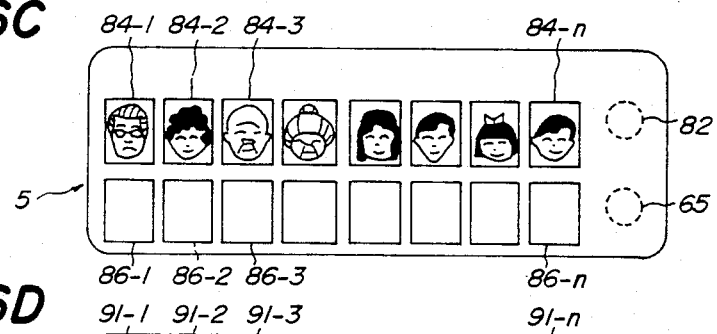
Figure 6D:
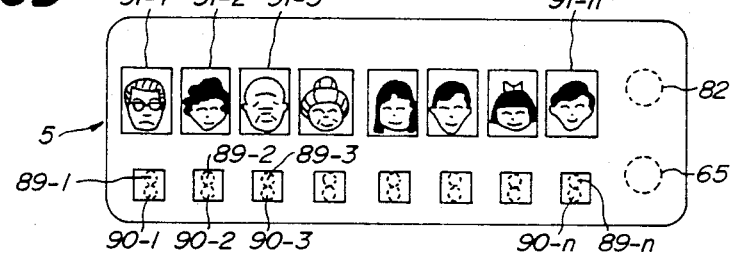
Figure 6E:
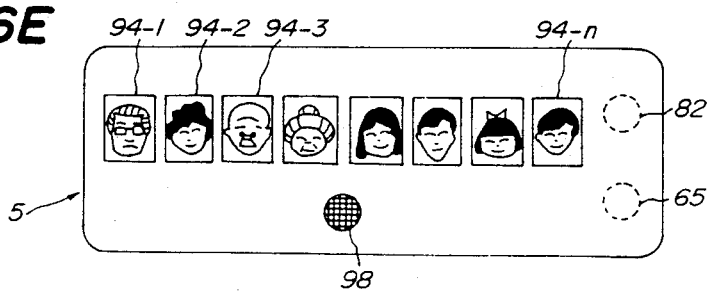
Figure 7C:
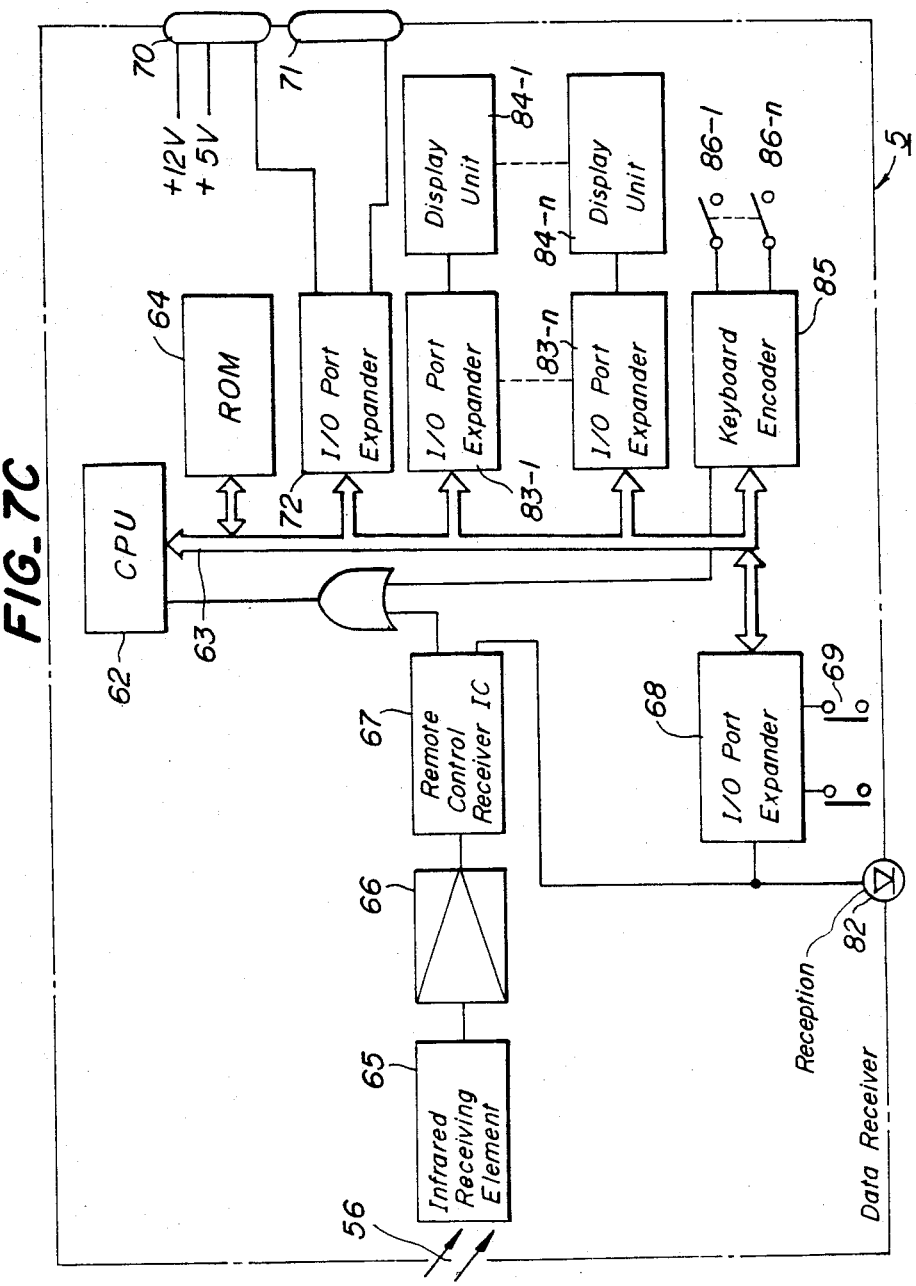
Figure 7E:
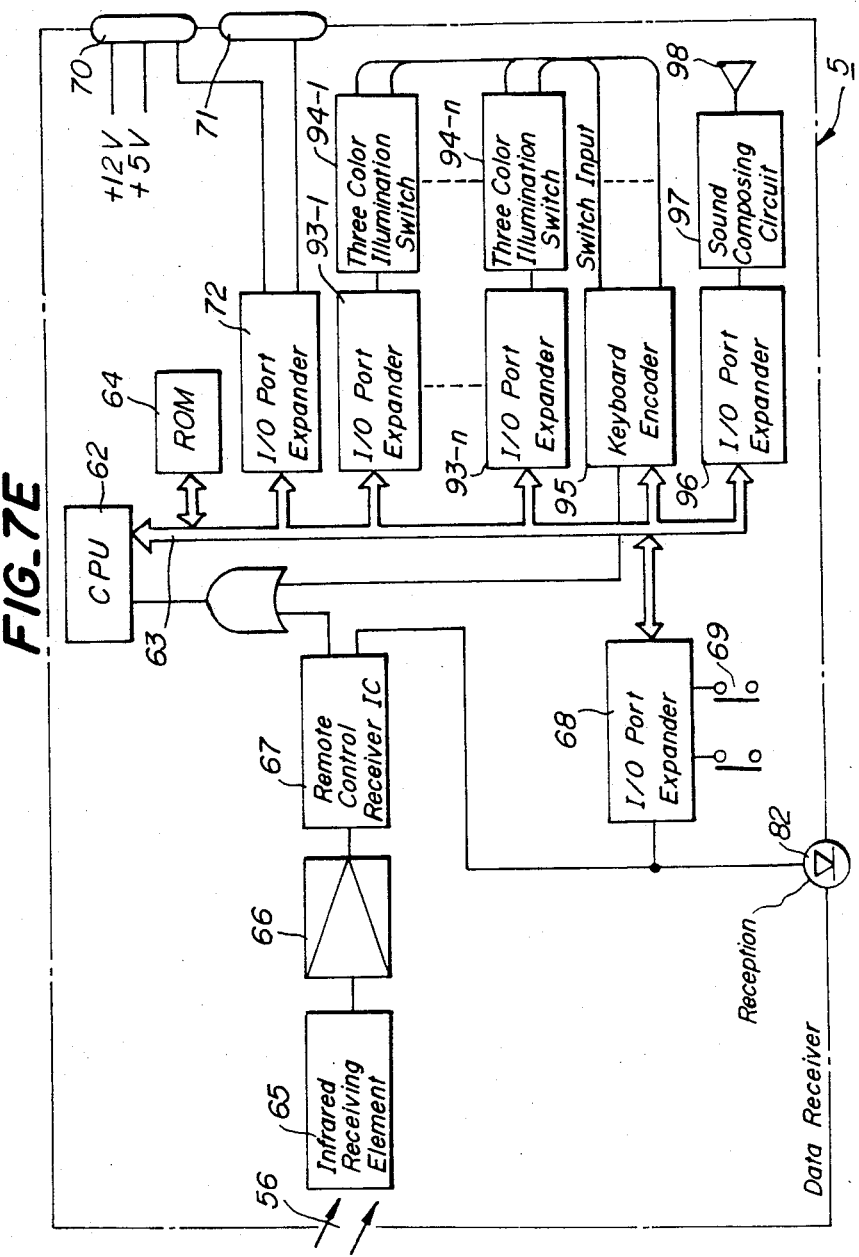

The display unit 73 is lit when a corresponding number key of the data transmitter 4 is pushed and then the start key 58a is pushed. When the end key 58b is pushed, the display unit 73 is turned off. The display unit 75 indicates items whose evaluation has been finished. The evaluation data is not displayed in order not to affect other panelists who are participating in the data entry. The display unit 73 is blinked when the evaluation data is not entered within a predetermined time period after the start key 58a was pushed, so that it requests the panelist to enter the evaluation data. FIGS. 6B and 7B illustrate a simple data receiver in which respective panelists are identified by the personal illustration images and a display unit 82 signals the reception of data. There are provided light emitting diodes 84-1~84-n for illuminating the illustration images of respective panelists. In this embodiment, eight illustration images are depicted. In accordance with the data entered into CPU 62, one of the light emitting diodes 84-1 to 84-n is selectively turned on via one of I/O port expanders 83-1 to 83-n. The above operation is controlled by CPU 62. FIGS. 6C and 7C illustrate another embodiment of the data receiver, in which touch keys 86-1 and 86-n are provided on the panel at positions corresponding to respective display units 84-1 to 84-n. Then it is possible to enter the personal data without using the personal data transmitter 4. In this embodiment, the interruption to CPU 62 is effected via a keyboard encoder 85 connected to the touch keys 86-1 to 86-n so as to control the display units 84-1 to 84-n. FIGS. 6D an 7D show still another embodiment of the data receiver, in which the display units are formed by light illumination keys 91-1 to 91-n and there are provided display units at positions corresponding to respective light illumination keys, each display unit comprising green and red light emitting diodes 89-1 to 89-n and 90-1 to 90-n. By means of this data receiver, it is possible to survey the viewers' evaluation of television programs and to conduct questionnaire research. The light illumination keys 91-1 to 91-n are controlled via I/O port expanders 88-1 to 88-n and keyboard encoder 92 and are turned on and off by touching the keys. The light emitting diodes 89-1 to 89-n and 90-1 to 90-n are controlled via I/O port expanders 87-1 to 87-n. When LEDs 89-1 to 89-n are turned on, a green light is generated, when LEDs 90-1 to 90-n are turned on, a red light is emitted, and when both LEDs 89-1 to 89-n and 90-1 to 90-n are turned on, an amber light (bright orange) is produced. In this manner, the evaluation with three grades can be carried out. When a panelist is required to enter evaluation data, the light emitting diodes may be blinked.

FIGS. 6E to 7E depict a modification of the embodiment illustrated in FIGS. 6D and 7D. In the present embodiment, the light illumination keys and light emitting diodes are combined to form three color illumination keys 94-1 to 94-n. One of three different colors is selected by I/O port expanders 93-1 to 93-n, and a selected light emitting diode is turned on and off by means of a keyboard encoder 95. In this case, in order to mitigate mental demands on panelists due to the blinking of light emitting diodes, a composed speech signal stored in ROM 64 is supplied via I/O port expander 96 and speech composing circuit 97 to a speaker 98 to reproduce a message.

The market research data entry device 7 is provided to enter data necessary for market research and send the entered data to the data processing device 8. FIG. 8 is a block diagram showing an embodiment of the market research data entry device, FIG. 9 shows its outer appearance, FIG. 10 depicts the arrangement of a panel of another embodiment, and FIG. 11 illustrats the outer appearance of bar-code reader.

As shown in FIG. 8, the device comprises CPU 100 for controlling various devices, data bus 101, ROM 102 for storing control programs, etc., RAM 103 for storing entered data temporalarily, interruption control circuit 116, timer 117, power supply source 118, power switch 119, display units 104, 105 for bar-codes, display units 106 for displaying store names, purchaser names, amounts and options, display unit 107 for price, LEDs 120 to 127 denoting store names, purchaser names, bar-code, error, amount, option, price and end, respectively, interfaces 108 to 111, keyboard 112, and start and stop switches SW$_1$ and SW$_2$. Further, a facsimile device or printer 15 is connected via interface 114 and terminal 129 to print out various kinds of input data, and a CRT display device 16 is connected via interface 131 and terminal 132 to display the information. Further, a speaker 134 is connected via an interface 133 to reproduce sound information. The data from the data center is entered from an input terminal 130, stored in the RAM 103 via an interface 115 and is supplied to the printer, CRT display device or speaker. A signal from the bar-code reader is received at a bar-code reader terminal 128 and is stored in RAM 103 via an interface 113.

As shown in FIG. 9, on the panel of the data receiver there are provided the display units 104, 105 for bar-codes, display units 106 for shop names, purchaser names, amounts and options, display unit 107 for price, LEDs 120, 121, 124 and 125 for respective items, LEDs 127 and 123 for displaying end and error, keypad 112, code list 135 and a place 137 for installing the bar-code. The display units 104 and 105 also serve as auxiliary display units. The order in which the data is entered is arbitrary, but it is convenient to effect the data entry for respective purchasers and shops, and it is preferable to enter bar-codes of products, amount of products and price. "X" key 112$a$ on the keyboard 112 is used to enter a unit price and amount to calculate a total price, and "&" key 112$b$ is used to effect the same operation such as oo and oo. When a plurality of different kinds of products are purchased and the prices of respective products are not known, a bar-code on the same kind of product is first readout, and then the number of products is entered with the aid of the keypad portion. Next, after pressing the "&" key, the same operation is continued for another kind of product. After the above mentioned operation has been completed for all the kinds of products, the total price is calculated. After entering data for all the items, the end LED 127 is turned on. Then, the "end" key 112$c$ is pushed and the entered data is converted into of data a given format and several data are combined to form a transmission data which is transmitted to the data processing device 8 via the interface 115 and terminal 130. "All clear" key 112$d$ is used to return to the initial condition if a data entry error occurs, and all data can be deleted before the "end" key 112$c$ is pushed. The "G" key 136 is to change the function of keys. The "G" key has a green color and the initial G function is recorded thereon. When the "G" key is pushed, the "X" key 112$a$ is converted into a "clear" key and the "price" key 112$e$ is converted into a "register" key. As will be explained later answers to questions may be entered with the aid of the keypad portion.

FIG. 10 shows another embodiment of the market research data entry device in which codes of purchasers and shop names are entered by pushing keys 138 and 140 corresponding thereto. Then, LEDs 139 and 141 are turned on. An auxiliary display unit 142 is provided for displaying entered amounts and prices. When data is entered by operating ten keys 143, entered numerical data is displayed on the auxiliary display 142. Then, "amount" key 144 or "Y" key 145 is pushed, and the data is written into RAM 103 and is displayed on the display units 106 and 107. The function of "X" key 146, "&" key 147, "G" key 148, bar-code key 149 and all clear key 150 are same as those in the embodiment illustrated in FIG. 9. There are further provided LEDs 152 which are turned on when the purchaser name, shop name, bar-code, amount and price are entered. Therefore, items which have not yet been entered can be easily found. After entering the data for all the items, "end" key 153 is pushed and all data is sent to the data processing device 8.

The bar-code is generally used for general goods and foods in the POS system and identifies the manufacturer's name and the kind of product. The bar-code is usually entered with the aid of the bar-code reader, but may be also entered by the keypad portion if the bar-code is so stained that it could not be read out by the bar-code reader. Suitable codes have been previously allocated to products without bar-codes and are entered with the aid of the keyboard. The bar-code reader 154 shown in FIG. 11 comprises a CCD line sensor installed therein. While a sensor portion 156 is pushed against the bar-code by grasping a handle 155, when a key 157 is pushed, the bar-code is picked up and entered. The bar-code reader may be constructed in various ways. For instance, a pen-like sensor may be traced over the bar-code or a product may be passed over a bar-code reader. The data entered by the bar-code reader is supplied via the terminal 128 shown in FIG. 8, and is stored in RAM 103 via the interface 113 and is displayed on the display units 104 and 105 via the interfaces 108 and 109, respectively.

Figure 13:
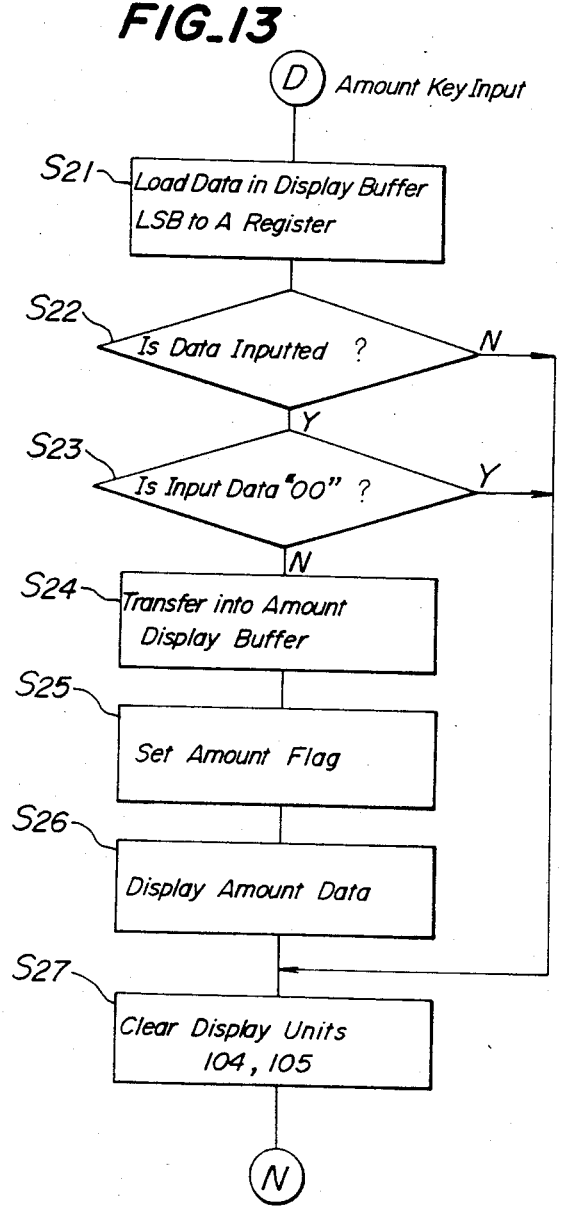
FIG. 13 is a flow chart for explaining the operation of entering the amount data.

Now the data entry operation with the aid of the market research data entry device of FIG. 9 will be explained with reference to flow charts. FIG. 12 is a flow chart for explaining the sequence-non-ordered-entry, FIG. 13 is a flow chart for explaining the operation for entering the amount data, FIG. 14 is a flow chart for explaining overall operation except for determining the total purchase and calculating a total price from unit price and amount, and FIG. 15 is a flow chart for explaining the operation in which the total purchase and the calculation of total price are effected.

According to the invention, various kinds of data can be entered at random and if there is an error in the data entry, the error can be corrected unless the end key 112$c$ $c$ pushed. FIG. 12 illustrates the operation of the data entry by pushing keys for respective items. It is apparent from this flow chart that the data can be entered in a sequence-nonordered-manner. As illustrated by Step S$_1$, when any one of the keys except those of the numerical keypad portion is pushed, a corresponding one of routines Ⓐ to Ⓚ is performed as shown by steps S$_2$ to S$_{12}$, and when any one of these keys is not pushed (that is, a numerical key is pushed instead), the data is entered. In this manner, data for any desired item may be entered at will, so that it is possible to enter the data in the non-ordered sequence mode. When one digit of the data is entered, a data entry counter is incremented by 1 (step $S_{13}$), and the number of effective digits is limited to thirteen (steps $S_{14}$ and $S_{15}$). The number of effective digits is set to two for the shop name, two for the purchaser name, two for the amount, six for the price and thirteen for a bar-code. Then, the data is displayed on the right hand side of the display units 104, 105 (steps $S_{16}$, $S_{18}$). it should be noted that the display units 104, 105 serve as the auxiliary display units. For instance, in the questionnaire mode, the routine Ⓐ is the questionnaire routine (step $S_{20}$) and is returned at step $S_{19}$.

The flow of the data process for the purchaser, shop, amount and price are substantially the same. Now the process for entering the amount data will be explained with reference to FIG. 13. At first, the data is entered, and is processed as shown in FIG. 12, and the entered data is set in a display buffer LSB (step $S_{17}$). When the amount key is pushed, the data stored in the display buffer is set in another register, for example A register (step $S_{21}$), and it is confirmed that data other than 0 has been entered (steps $S_{22}$, $S_{23}$). Then the data is transferred to an amount display buffer register (step $S_{24}$), an amount flag is generated (step $S_{25}$) and the amount is displayed on the display unit 106 (step $S_{26}$). The display units 104, 105 are cleared and then the routine is returned (step $S_{27}$).

Figure 14:
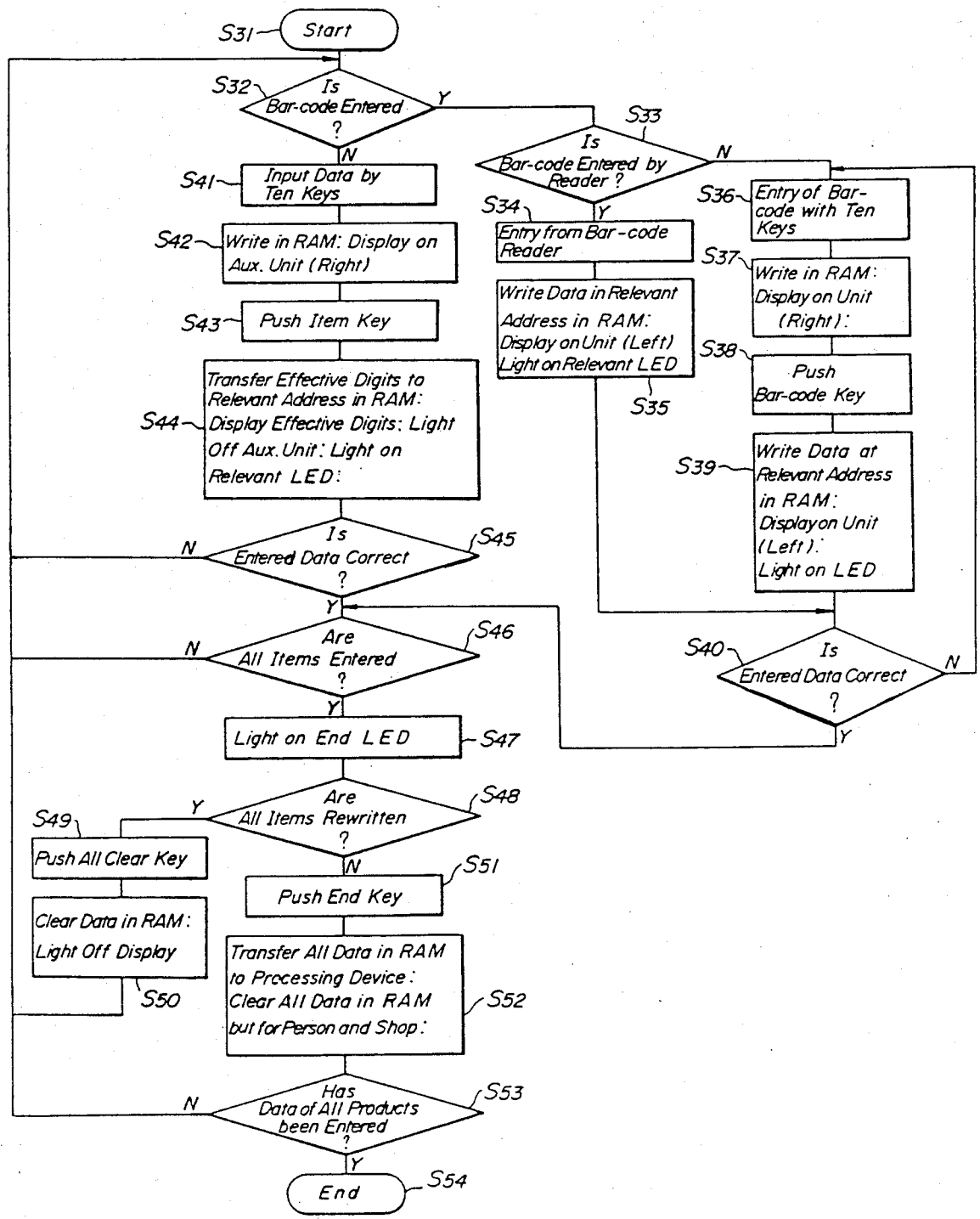
FIG. 14 is a flow chart for explaining the general operation of the market research data entry device except for determining the total purchase and total price.
Figure 15:
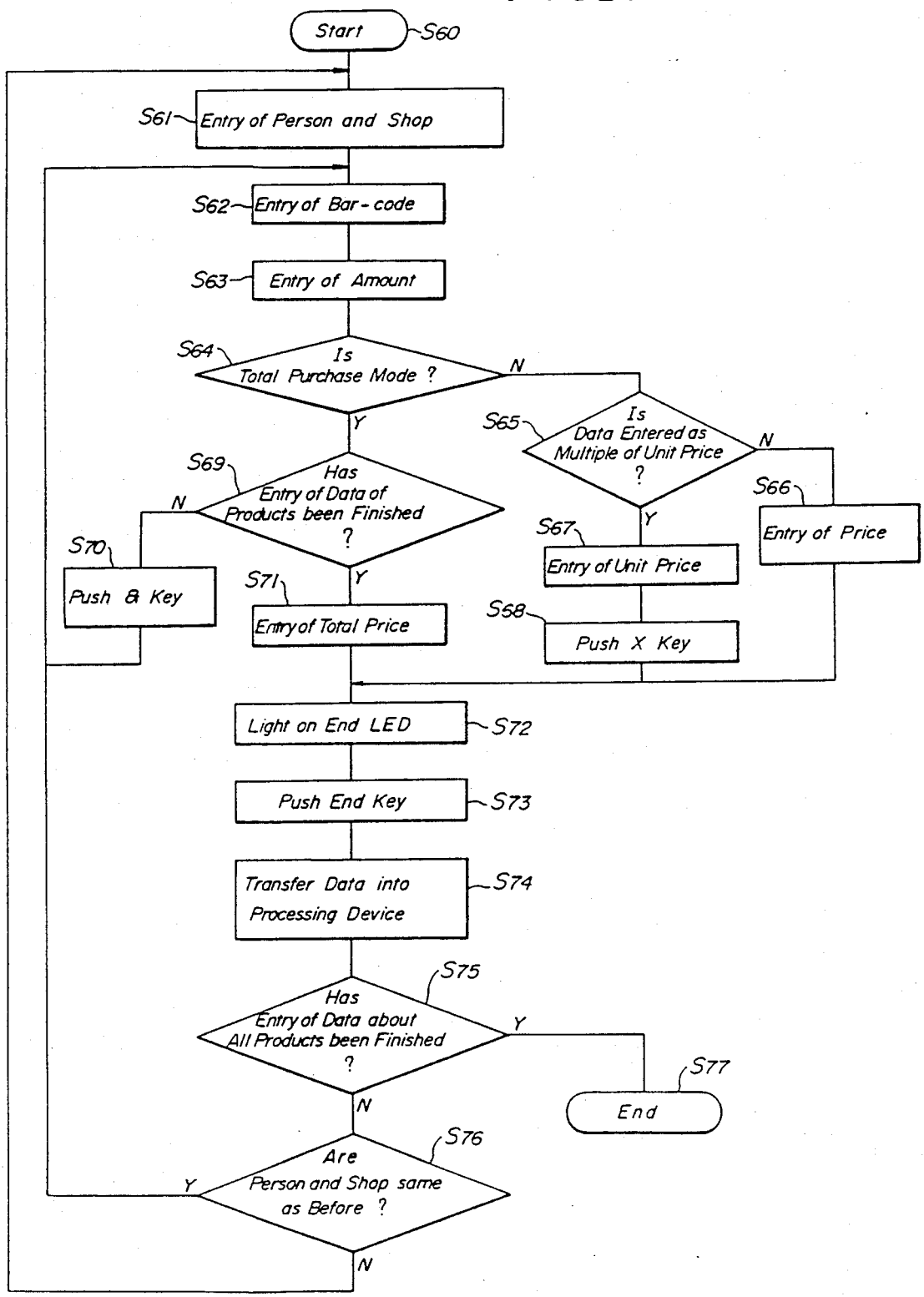
FIG. 15 is a flow chart for explaining the general operation of the market research data entry device to determine the total purchase and total price.

FIGS. 14 and 15 are flow charts showing the entire process of data entry. As illustrated in FIG. 14, when the data concerning the purchaser, shop, amount and price except for the bar-code is being entered with the aid of the ten-key keypad portion (step $S_{41}$), the data entered is displayed on auxiliary display units 104, 105 (step $S_{42}$). The effective digits are displayed when an item key is pushed. The data is transferred to a given address position of RAM 103, and the display units 104, 105 are cleared and a corresponding LED is turned on (step $S_{44}$). If the operator finds that the data has been entered erroneously (step $S_{45}$), correct data is re-entered and a corresponding key is pushed. Then, the content in RAM 103 is re-written, and the content of the display is also changed. After the data for one item has been entered, data for the next item is entered by repeating the same operation. When a bar-code is entered with the aid of the bar-code reader (step $S_{34}$), the data is accessed by the bus 101 from the terminal 128 via the interface 113, and then is stored in a corresponding address position in RAM 103. At the same time, the entered data is displayed on the left hand sides of the display units 104, 105 via the interfaces 108, 109, so that LED 122 is turned on (step $S_{35}$). If the bar-code is stained and cannot be picked up by the bar-code reader (step $S_{33}$), the data is entered with the aid of the ten-key keypad portion (step $S_{36}$). The data is written in RAM 103 and is displayed on the right hand side of the display units 104, 105 (step $S_{37}$). When the "bar-code" key 112f is pushed (step $S_{51}$), all data is transferred to a given address position of RAM 103, and displays except for the purchaser and shop are cleared (step $S_{52}$). This is due to the fact that the market research data of a group can be often entered for one purchaser and a small number of shops, so that even after the end key 112c is pushed, the next data entry can be effected simply and efficiently by entering data for items except for the purchaser and shop. If all the entered data is erroneous (step $S_{48}$), the all clear key 112d is pushed (step $S_{49}$). Then all the data is cleared (step $S_{50}$) and the routine is returned into the initial step, and data is re-entered.

Next, the consolidation of the total purchase and the calculation of the total price from the unit prices and the amounts will be explained with reference to FIG. 15. In this case, it is preferable to enter previously the purchaser and shop (step $S_{61}$). This is due to the same reason as that explained with respect to the step $S_{52}$ in FIG. 14, i.e. a group of products is usually purchased by the same person in the same shop. At first, a bar-code and an amount of the kind of product identified by the bar code are entered (steps $S_{62}$, $S_{63}$). In case of a series of purchases (step $S_{64}$), after '&' key 112b is pushed (step $S_{70}$), a bar-code and the amount of the next kind of product are entered. This operation is carried out for all products, and then a total price is entered (step $S_{71}$). In case of a separate purchase (step $S_{65}$), the unit price is first entered (step $S_{67}$), and the "X" key 112a is pushed to display a total price. When a number overflows, 'EEEEEE' is displayed for one second, and the next data entry is awaited (step $S_{68}$). When the data entry is finished, the end LED 127 is turned on (step $S_{72}$), and then the entered data is transferred into the data processing device (step $S_{74}$), when the end key 112c is pushed (step $S_{73}$). The above operation is repeated for were products which were bought in the total price mode as well as in the separate price mode. When the purchase and shop are different from the previous ones, the data has to be re-entered.

Figure 16:
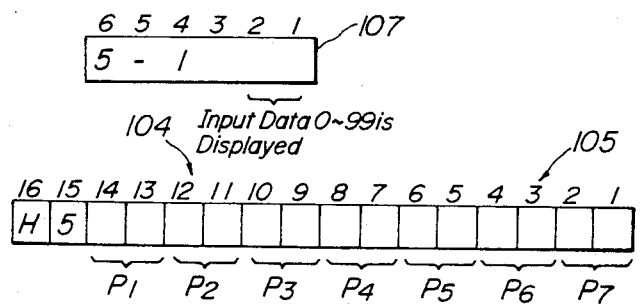
FIG. 16 is a schematic view showing a displayed content during the questionnaire survey.

Next, the method of using the "G" key 136 will be explained. As was explained before, the "g" key is used to convert the functions of various keys so as to provide functions suitable for entering the answers to the questions. This is due to the fact that if the number of keys on the keyboard is increased, the efficiency might be decreased and the possibility of error might be increased. Such a conversion of functions is generally adopted in personal computers and word processors. In the present embodiment, the questionnaire survey is conducted using marks and numerals shown in FIG. 16, but the embodiment may be adapted to another mode of questionnaire research as well as another purposes. Questionnaire booklets have been previously distributed and answers to questions described in the booklets are entered by denoting two digit numbers with the aid of the ten-key keypad portion. When the operator pushes "G" key 136, "H5" is displayed on the left hand side of display unit 104. "H5" represents page 5. Furthermore "5-1", which indicates that first item on page 5, is displayed at the left hand side on the display unit 107. Since the question initiates from page 5, "H5" is first displayed. In response to such a display, the operator enters his or her answer to the first question on page 5. The entered numerals are displayed on the right hand sides of the display units 107 and 105 (position $P_7$), and then the display on the left hand side of the display unit 107 is changed to 5-2. When an answer to the second question is entered, the number for the first item displayed on the unit 107 is changed, and the number for the first item is shifted to position $P_6$ and a two-digit number expressing the answer to the second question is displayed at the position $P_7$. The operation is repeated up to the seventh item, and the seven two-digit numbers are displayed on the display units 104, 105 at positions $P_1$ to $P_7$. When the number of questionnaire items exceeds seven, the page is automatically changed. Since the maximum capacity is set to a predetermined number of items, such as 35 items, after the answer to the seventh item on page 9 has been entered or during this operation, when the end key 112c c is pushed, the entered data is converted into the given format and is transferred to the data processing device. The clear key 112a can be used to delete the entered data partially, and when this key is pushed, the digits displayed on the units 104, 105 are shifted rightward by one character and one digit is deleted from the displayed digits on the unit 107. The all clear key 112d is used to cancel the questionnaire research mode and the initial condition is re-called.

Figure 17:
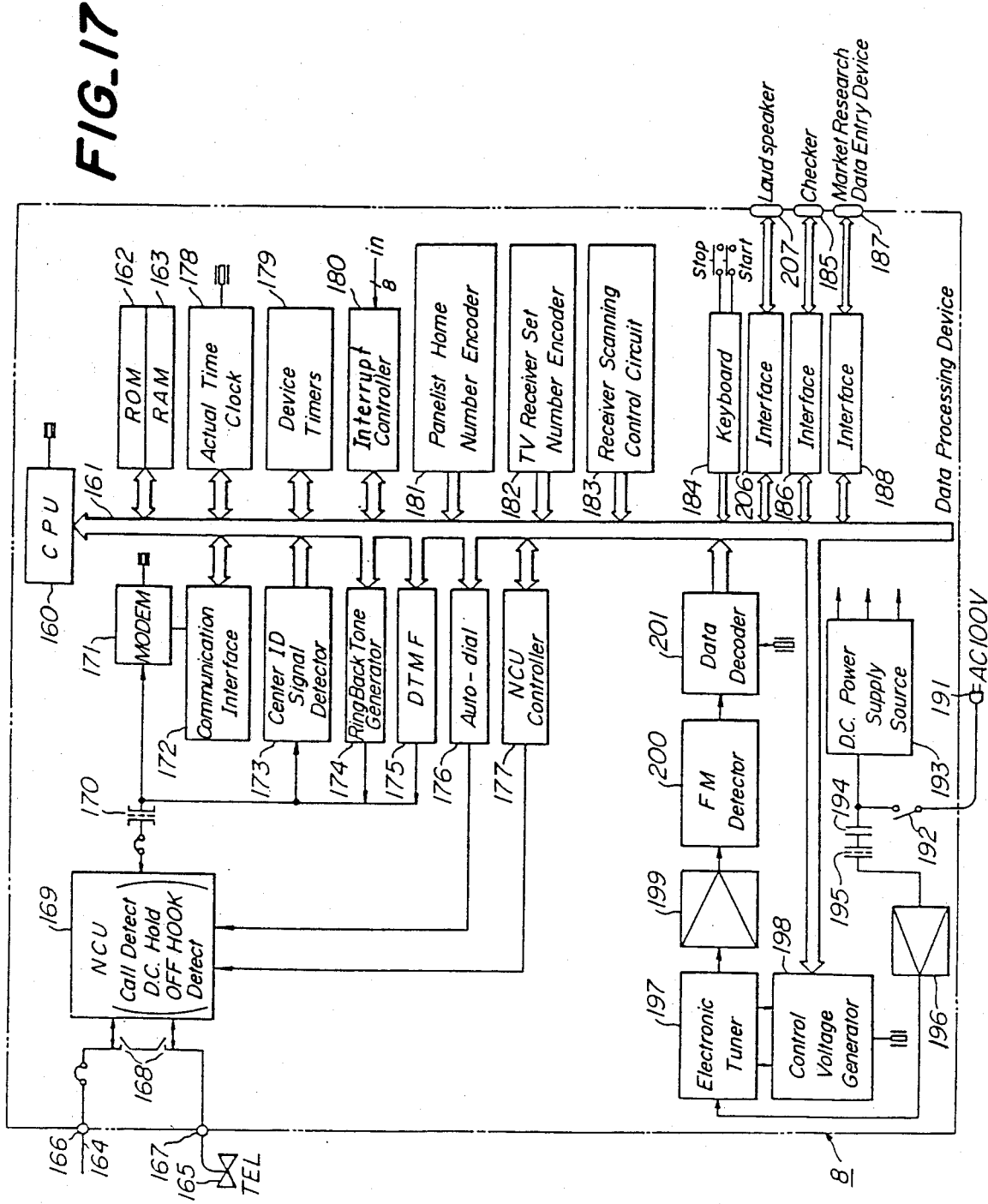
FIG. 17 is a block diagram showing the construction of an embodiment of a data processing device.

FIG. 17 is a block diagram illustrating the construction of the data processing device 8. The data processing device 8 has the functions of receiving the channel data and questionnaire data via the domestic power supply lines and the market research data via the cable, of storing the received data and of transmitting the stored data to the data center in response to the polling from the data center. This operation of the data processing device 8 is controlled by CPU 160 and necessary programs therefor are stored in ROM 162. The received data is stored in RAM 163. The processed data is also stored in RAM 163 via a data bu 161. The data from the market research data entry device 7 is conveyed to the common data bus 161 from a terminal 187 via an interface 188. The data from the channel detector 3 and the data from the data transmitter 4 are transmitted over the domestic power supply lines. Therefore, by inserting an AC plug 191 into a socket, the data signal is supplied through power switch 192, capacitor 194 and transformer 195 to an amplifier 196. Then the amplified data signal is supplied to an electronic timer 197 in which the carrier frequencies are scanned by a control voltage generator 198 under the control of CPU 160. The picked-up signal is first amplified by an amplifier 199 and then is detected by FM detector 200. The detected signal is supplied to a decoder 201 to reproduce the original data signal, which is then supplied to CPU 160 via the common bus 161. In CPU 160, the received data signal is processed together with the data stored in RAM 163, the time data and data from encoders into the transmission data having a given format. The data thus produced is stored in RAM 163. The data processing device 8 further comprises a real time clock 178 for generating a current time signal, and a set of timers 179 for respective devices. A home number encoder 181 generates a code number of the panelist's home, a receiver number encoder 182 produces respective code numbers of television receiver sets provided in the panelist's home, and a television receiver set scanning control circuit 183 controls the scanning of a maximum of eight television receiver sets. A keyboard 184 is provided for effecting manual start/stop of the data collection. Since all the data is acquired in an interruption mode, an interruption control circuit 180 is provided. Further, to a terminal 185 is connected a checker which checks the operation of the circuit via an interface 186. The data transmission is effected in response to polling from the data center in a given time period during which the telephone traffic is small, i.e. midnight or early morning, so that the panelist's home is not disturbed, but if necessary, a call may be effected during this time period. A telephone set 165 and telephone line 164 are connected to a network control unit (NCU) 169 via switches 168. NCU 169 is controlled by an NCU control circuit 177. If a telephone call is received during the predetermined time, usually around midnight, during which the data transmission is destined to be effected, a check is made by signal detector 173 to determine whether the call was sent from the data center or a third party by detecting an identification signal transmitted from the data center. If the call is judged to be a normal call from a third party, a ring back tone generator 174 sends a ring back tone and a bell or buzzer is rung. If the call was sent from the data center, the data processing device is accessed automatically and the data stored therein is transmitted to the data center. It is also possible to transmit the data at a time outside the predetermined time. In this case, after confirming that the telephone set is not in use, and waiting for a predetermined time, the data center is called by means of an auto-dial circuit 176 if the telephone set is dial type or DTMF 175 if the telephone set is a push button type. If the data center responds to the call, the data is transmitted to the data center one by one. When the data transmission is finished, the initial condition is recovered. The data is transmitted by means of communication interface 172, MODEM 171, transformer 170 and NCU 169.

The data format may be designed by considering various factors such as the kinds and amounts of data, future extension, the necessary transmission rate, transmission control and protection for power interruption and interference. In the present embodiment, sixteen codes are provided, and data and control items are allocated to respective codes. For instance, the fifth code is allocated to the channel data transmitted via the domestic power supply lines and questionnaire data.

FIG. 18 shows an example of the data format, in which the first character 0 is allocated to the code number and characters 1~4 are allocated to the external data which is received at the input terminals 46~49 in FIG. 2. In this embodiment, only the questionnaire data is provided as the external data, and the contents of characters 1 and 2 are set to "O". Characters 5 to B are allocated to the time at which the relevant data is produced. In the drawing, the time codes represent Friday, 15 o'clock, 55 minutes and 5 seconds. The characters C and D are used to transmit the channel number, and the characters E and F are allocated to the television receiver set number. In the drawing, it is understood that the television receiver set No. 1 reproduces the channel No. 1. The remaining codes are also formed in a similar manner in accordance with the characteristics of the codes. These codes are produced every time new data or on event occurs. For instance, the fifth code corresponding to the channel data is produced every time the channel is changed and the power switch of the television receiver set is switched on and off. A first code indicating power supply interruption is generated every time the power supply is interrupted. The data thus formed is transmitted to the data center at a predetermined time or at a desired time. In this case, a first row of the data includes the code illustrated in FIG. 19. A code number "4" represents the start of the data collection, and the characters 1 and 2 are set to "F". Characters C~F represent the panelist's home number.

As was explained above, according to the invention, the television audience rating survey apparatus and the market research apparatus can be integrally formed in a highly economical manner. Further, not only can the television audience rating for a broadcasted commercial be known, but also the market research data of a relevant product and the effect of the commercial can be obtained substantially in a real time manner. In the known television audience rating survey apparatus, it is merely possible to know how many panelists watched the commercial, but according to the invention it is possible to know the number of panelists who were interested in the commercial, who wanted to buy the product and who actually bought the products, so that the final effect of the commercial can be known. Such an advantage is extremely remarkable.

Moreover, since the personal identification information is added to the channel data, market research data and questionnaire research data, it is possible to derive television audience ratings, evaluations, market research data and questionnaire research data for respective family composition, respective ages and respective sexes. Further, research beyond the normal commercial can be effected, if necessary. The is a new merit which could never be attained by the known survey of television audience ratings and market research. In the above embodiments, the effect of commercials in the market research is surveyed, but the present invention is not limited to such market research, but may be applied to various surveys of social phenomena, and positive and fruitful data can be presented promptly.

Since illustration images may be provided on the data transmitter and receiver, erroneous operation due to an operator's forgetting his or her own identification number of remembering a wrong identification number can be avoided. In a television audience rating survey, the start and end of the program watching can be entered by actuating the personal identification switch on the data transmitter in on/off manner, so that the number of keys on the keyboard can be reduced and the operation can be simplified. When a questionnaire style evaluation is conducted in a real time mode, since switches for denoting evaluation items are not necessary, the number of keys can be further decreased, and in a survey of the television audience ratings, it is sufficient to provide only the personal identification switches. In the data receiver, since lighted illumination switches with personal illustration images or three color illumination switches are used, the number of parts can be reduced and the switches can be easily identified.

When market research data is being entered with the aid of the market research data entry device, the data can be entered in a random order, so that the data entry can be carried out efficiently. Further, the data can be entered at a speed suitable for respective operators, a large amount of data can be entered without error due to monotonous operation. Further, since the items which have been already entered can be identified by the lighting-on condition of LEDs or displays, double entering or no-entering can be effectively prevented. Moreover, by using the 'G' key, evaluations for purchased products and answers to questions can be also entered. This results in that the applicable field can be expanded over the usual market research.

What we claim is:

1. An apparatus for collecting television channel data and market research data, comprising:
    a channel detector means for detecting a channel of a television receiver being viewed by panelists to provide channel data;
    a personal data entry device means for entering personal identification information which is added to the channel data supplied from the channel detector means;
    a market research data entry device means for entering market research data including a plurality of information items regarding each of a plurality of purchased products, said market research data entry device means including means for entering the market research data in a sequence-non-ordered mode wherein a panelist is not constrained to enter information items for a purchased product in a predetermined order, and means for entering personal identification information which is added to the market research data; and
    a data processing device means for receiving the channel data and market research data supplied from the channel detector means and the market research data entry device means, respectively, to provide data having a predetermined format, for storing the data having a predetermined format, and for transmitting the data having a predetermined format to a data center, said data processing device means including means for transmitting the channel data having the personal identification data added thereto and the market research data having the personal identification information added thereto to the data center via a subscriber telephone link of a panelist's home in response to a polling from the data center within a predetermined time period.

2. A data collecting apparatus according to claim 1, further comprising means for transmitting the channel data from the channel detector means to the data processing device means via domestic power supply lines.

3. A data collecting apparatus according to claim 1, wherein said personal data entry device means comprises a data transmitter and a data receiver connected to the channel detector means.

4. A data collecting apparatus according to claim 3, wherein said data transmitter comprises means for entering personal data, means for denoting items, and means for entering evaluations.

5. A data collecting apparatus according to claim 4, wherein said means for entering the personal data in the data transmitter comprises keys having illustration images of respective persons displayed thereon.

6. A data collecting apparatus according to claim 4, wherein said means for denoting items comprises a numerical keypad.

7. A data collecting apparatus according to claim 4, wherein said means for entering evaluations comprises three keys having predetermined indicia.

8. A data collecting apparatus according to claim 3, wherein said data transmitter comprises switches allocated to respective persons and having illustration images of respective persons applied thereto.

9. A data collecting apparatus according to claim 3, wherein said data receiver comprises display units for displaying illustration images of respective persons.

10. A data collecting apparatus according to claim 9, wherein said data receiver further comprises touch-type selection switches for identifying respective persons.

11. A data collecting apparatus according to claim 9, wherein each of said display units for displaying the illustration images comprises a light illumination switch and light emitting diodes each selectively emitting one of three colors.

12. A data collecting apparatus according to claim 9, wherein each of said display units for displaying illustration images comprises a light illumination switch which emits selectively one of three colors.

13. A data collecting apparatus according to claim 1, wherein said market research data entry device means comprises a bar-code reader for reading bar-codes, a plurality of person keys, each denoting a respective purchaser, a plurality of shop keys, each denoting a respective shop from which products may be purchased, and a numerical keypad for entering an amount of the products and a price.

14. A data collecting apparatus according to claim 13, wherein said market research data entry device means furhter comprises an additional key for entering a total price of plural kinds of purchased products.

15. A data collecting apparatus according to claim 13, wherein said market research data entry device means further comprises another key for entering a price of a plurality of purchased products.

16. A data collecting apparatus according to claim 13, wherein said market research data entry device means further comprises a further key for converting the function of respective keys.

17. A data collecting apparatus according to claim 16, wherein said market research data entry device means further comprises means for conducting questionnaire research, said means for conducting questionnaire research being effected with the aid of said further key.

18. A data collecting apparatus according to claim 16, wherein said data collecting apparatus is employed to selectively conduct television audience rating surveys and market research evaluations, said further key being used to effect the television audience rating surveys or the market research evaluations.

19. A data collecting apparatus according to claim 1, wherein said data processing device means comprises means for connecting a subscriber telephone link to a telephone set during a time outside said predetermined time period and to an internal circuit during said predetermined time period, means for allowing the telephone set to be used even in the predetermined time period unless the communication between the data processing device means and data center is effected, means for identifying a call signal from the subscriber telephone link during the predetermined time period, means for identifying a call signal from the data center, means for identifying a call from a third party and connecting the telephone set to the telephone link, means for receiving the market research data via a terminal, means for receiving the channel data having the personal identification data added thereto via domestic power supply lines, timers, means for forming the data having a predetermined format from the received data and the panelist's home number, a receiver set number, a real time signal, and signals from the timers, means for communicating with respect to the data center, means for storing the data having a predetermined format and sending the data having a predetermined format to the data center in response to the polling from the data center, and means for calling the data center.

20. A data collecting apparatus according to claim 1, wherein said market research data entry device means comprises a bar-code reader for reading bar-codes, an amount key, a price key, a shop key, a person key, and a numerical keypad for entering amounts and a numerical keypad for entering amounts when the amount key is actuated, prices of purchased products when the price key is actuated, a shop identification number when the shop key is actuated, and a purchaser identification number when the person key is actuated.

21. A data collecting apparatus according to claim 20, wherein said market research data entry device means further comprises an additional key for entering a total price of plural kinds of purchased products.

22. A data collecting apparatus according to claim 20, wherein said market research data entry device means further comprises another key for entering a price of a plurality of purchased products.

23. A data collecting apparatus according to claim 20, wherein said market research data entry device means further comprises a further key for converting the function of respective keys.

24. A data collecting apparatus according to claim 23, wherein said market research data entry device means further comprises means for conducting questionnaire research, said means for conducting questionnaire research being effected with the aid of said further key.

25. A data collecting apparatus according to claim 23, wherein said data collecting apparatus is employed to selectively conduct television rating surveys and market research evaluations, said further key being used to effect the television audience rating surveys or the market research evaluations.

26. A data collecting apparatus according to claim 1, wherein the information items regarding each of a plurality of purchased products include the type and amount of purchased products and where the products were purchased.

27. A data collecting apparatus according to claim 26, wherein the information items regarding each of a plurality of purchased products further include the price of the purchased products.

28. A method for collecting market research data using a market research data entry device at a panelist's home, the market research data entry device having data entry means for receiving data manually entered by a panelist, and for collecting data regarding usage of a television receiver at the panelist's home, said method comprising the steps of:

(a) manually entering information items regarding a purchased product in a sequence-non-ordered mode wherein the panelist is not constrained to enter information items in a predetermined order, step (a) including the sub-steps of (a-1) entering a number, along with category data identifying whether the number represents a first information item regarding the purchased product or a second information item regarding the purchased product, and (a-2) entering an additional number, along with category data identifying whether the additional number represents the first information item regarding the purchased product or the second information item regarding the purchased product;

(b) storing data derived from the manually entered information items at the panelist's home;

(c) collecting channel data which identifies the channel to which the television receiver is tuned when the television receiver is being watched by at least one person in the panelist's home, along with personal identification data which identifies the at least one person watching the television receiver;

(d) storing the channel data and the personal identification data at the panelist's home; and (e) transmitting the stored data from the panelist's home to a data center via a telephone link.

29. The method of claim 28, wherein the category data entered in sub-steps (a-1) and (a-2) further identifies whether the number and additional number, respectively, represent a third information item regarding the purchased product, and wherein step (a) further includes a sub-step (a-3) of entering another number, along with category data identifying whether the another number represents the first, second, or third information item regarding the purchased product.

30. The method of claim 29, wherein the first information item is the price of the purchased product, the second information item is the amount of the purchased product, and the third information item is one of the identity of the vendor of the purchased product, the identity of the purchaser of the purchased product, and the identity of the purchased product itself.

31. The method of claim 28, wherein the first information item is the price of the purchased product and the second information items is the amount of the purchased product.

32. The method of claim 28, wherein the purchased product bears a bar code, wherein the data entry means includes a bar code reader and a keyboard having numerical keys and further keys, wherein one of sub-steps (a-1) and (a-2) is conducted by scanning the bar code on the purchased product with the bar code reader and depressing one of the further keys, and wherein the other of sub-steps (a-1) and (a-2) is conducted by depressing at least one numerical key and a different one of the further keys.

33. The method of claim 28, further comprising, before step (b) is conducted, the step of manually entering information items regarding another purchased product is a nonsequence-ordered mode wherein the panelist is not constrained to enter information items in a predetermined order.

* * * * *